US012801540B2

(12) United States Patent
LaMoore et al.

(10) Patent No.: US 12,801,540 B2
(45) **Date of Patent: *Nov. 17, 2026**

(54) LARGE PACKET DAISY CHAIN SERIAL BUS

(71) Applicant: Graco Minnesota Inc., Minneapolis, MN (US)

(72) Inventors: Morgan O. LaMoore, Minneapolis, MN (US); Pavel V. Tysyachuk, Bloomington, MN (US); Adriana F. Mickols, Fridley, MN (US); Nicholas T. Fritz, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 83 days.

This patent is subject to a terminal disclaimer.

(21) Appl. No.: 19/054,283

(22) Filed: Feb. 14, 2025

(65) Prior Publication Data

US 2025/0190375 A1 Jun. 12, 2025

Related U.S. Application Data

(63) Continuation of application No. 18/091,596, filed on Dec. 30, 2022, now Pat. No. 12,229,058, which is a (Continued)

(51) Int. Cl.
*G06F 13/10* (2006.01)
*G06F 1/26* (2006.01)
(Continued)

(52) U.S. Cl.
CPC ............ *G06F 13/102* (2013.01); *G06F 1/266* (2013.01); *G06F 13/1668* (2013.01); *G06F 13/4247* (2013.01); *G05B 2219/1215* (2013.01)

(58) Field of Classification Search
CPC .......................... G05D 1/0088; G06F 9/45558
See application file for complete search history.

(56) References Cited

U.S. PATENT DOCUMENTS 5,090,012 A 2/1992 Kajiyama et al.
6,032,208 A 2/2000 Nixon et al.
(Continued)

FOREIGN PATENT DOCUMENTS

CN 101067804 A 11/2007
CN 104285190 A 1/2015
(Continued)

OTHER PUBLICATIONS

"Battery control circuit using non-isolation daisy-chain architecture for a 400V Li-ion battery system of a hybrid electric vehicle," Akihiko Emori, et al., IEEE Vehicle Power and Propulsion Conference (VPPC), Sep. 3-5, 2008, Harbin, China.
(Continued)

*Primary Examiner* — Getente A Yimer
(74) *Attorney, Agent, or Firm* — Kinney & Lange

(57) ABSTRACT

A communication system for an industrial process includes multiple slave modules connected in series with a master controller. The master controller stores a communication schedule that defines an ordered sequence of messages and identifiers associated with each message. The master controller transmits messages downstream through the slave modules to a terminal one of the slave modules. The terminal slave module generates a return message that is transmitted upstream to the master controller. Each slave module receives each downstream message, identifies based on the message identifier whether the message is associated with response information from the slave module, and inserts the response information into corresponding upstream messages.

20 Claims, 10 Drawing Sheets

Related U.S. Application Data continuation of application No. 17/721,479, filed on Apr. 15, 2022, now Pat. No. 11,704,257, and a continuation-in-part of application No. 16/715,750, filed on Dec. 16, 2019, now Pat. No. 11,546,187.

(60) Provisional application No. 62/851,248, filed on May 22, 2019, provisional application No. 62/780,561, filed on Dec. 17, 2018.

(51) Int. Cl.
*G06F 13/16* (2006.01)
*G06F 13/42* (2006.01)

(56) References Cited

U.S. PATENT DOCUMENTS

| | | | |
|---|---|---|---|
| 6,098,116 | A | 8/2000 | Nixon et al. |
| 6,665,742 | B2 | 12/2003 | Owen et al. |
| 7,433,302 | B2 | 10/2008 | Allen |
| RE40,817 | E | 6/2009 | Krivoshein et al. |
| 8,428,054 | B2 | 4/2013 | Miller |
| 8,625,625 | B2 | 1/2014 | Anderson et al. |
| 8,650,304 | B2 | 2/2014 | Anderson et al. |
| 8,651,878 | B2 | 2/2014 | Bjorklund |
| 8,670,457 | B2 | 3/2014 | Anderson et al. |
| 8,937,966 | B2 | 1/2015 | Kretschmann et al. |
| 9,081,742 | B2 | 7/2015 | Sonnier et al. |
| 9,535,415 | B2 | 1/2017 | Keller et al. |
| 9,645,572 | B2 | 5/2017 | Telljohann et al. |
| 9,723,767 | B2 | 8/2017 | Kojima et al. |
| 9,768,572 | B1 | 9/2017 | Gelineau et al. |
| 9,960,997 | B2 | 5/2018 | Balasubramanian et al. |
| 10,139,812 | B2 | 11/2018 | Jones et al. |
| 10,198,871 | B1 | 2/2019 | Hariton |
| 10,484,198 | B2 | 11/2019 | Krumsiek |
| 10,572,162 | B2 | 2/2020 | Rantanen et al. |
| 10,678,225 | B2 | 6/2020 | Kidd et al. |
| 11,546,187 | B2 | 1/2023 | Lamoore et al. |
| 11,704,257 | B1 | 7/2023 | Tysyachuk et al. |
| 2004/0088434 | A1 | 5/2004 | Takabatake |
| 2006/0190112 | A1 | 8/2006 | Buesgen et al. |
| 2008/0052417 | A1* | 2/2008 | Aoyama ............... H04L 1/0045 710/1 |
| 2010/0023657 | A1 | 1/2010 | Fukuda et al. |
| 2012/0179849 | A1* | 7/2012 | Mizutani ........... H04L 12/40013 710/110 |
| 2013/0301495 | A1 | 11/2013 | Miller |
| 2014/0254431 | A1* | 9/2014 | Yan ........................ H04Q 11/04 370/255 |
| 2014/0277597 | A1 | 9/2014 | Le Sant et al. |
| 2016/0091903 | A1 | 3/2016 | Patton et al. |
| 2016/0205066 | A1 | 7/2016 | Attarwala et al. |
| 2017/0070564 | A1 | 3/2017 | Sinistro et al. |
| 2017/0222829 | A1 | 8/2017 | Kessler et al. |
| 2018/0004953 | A1 | 1/2018 | Smith et al. |
| 2019/0018785 | A1 | 1/2019 | Beard et al. |
| 2019/0278698 | A1* | 9/2019 | Ahner ................. G06F 11/3698 |
| 2020/0076713 | A1* | 3/2020 | Meyer ..................... H04L 69/22 |
| 2020/0192315 | A1 | 6/2020 | Lamoore et al. |
| 2020/0218240 | A1 | 7/2020 | Håkansson et al. |
| 2021/0089276 | A1 | 3/2021 | Dunn et al. |
| 2021/0103690 | A1 | 4/2021 | Stump et al. |
| 2021/0318889 | A1* | 10/2021 | Waterman ........... G06F 13/4072 |

FOREIGN PATENT DOCUMENTS

| | | | |
|---|---|---|---|
| EP | 1658535 | B1 | 8/2012 |
| EP | 3166258 | A1 | 5/2017 |
| JP | S63275237 | A | 11/1988 |
| JP | H11136243 | A | 5/1999 |
| JP | 2015149541 | A | 8/2015 |
| JP | 2017192301 | A | 10/2017 |
| WO | 2019054929 | A1 | 3/2019 |

OTHER PUBLICATIONS

"Design of Reatime System for a Fieldbus-based Embedded Motion Controller," Lim Liming, et al., China Mechanical Engineering, Feb. 25, 2013.

Extended European Search Report for European Patent Application No. 23167666.9, date Aug. 4, 2023, 8 pages.

First Chinese Office Action for CN Application No. 201980089450.3, dated Jun. 30, 2022, 28 pages.

International Search Report and Written Opinion for International Patent Application PCT/US2019/066574, dated Feb. 13, 2020, 13 pages.

Japanese Office Action for Japanese Patent Application No. 2021-534369, dated Jan. 17, 2024, four pages (including translation).

* cited by examiner

LARGE PACKET DAISY CHAIN SERIAL BUS

CROSS-REFERENCE TO RELATED APPLICATIONS

This application is a continuation of U.S. application Ser. No. 18/091,596 filed Dec. 30, 2022 for "LARGE PACKET DAISY CHAIN SERIAL BUS", which in turn claims the benefit of continuation U.S. patent application Ser. No. 17/721,479 filed Apr. 15, 2022, now U.S. Pat. No. 11,704,257 on Jul. 18, 2023 and entitled "SYSTEM PROVISIONING USING VIRTUAL PERIPHERALS", which in turn claims the benefit of continuation-in-part U.S. patent application Ser. No. 16/715,750 filed Dec. 16, 2019, now U.S. Pat. No. 11,546,187 on Jan. 3, 2023 entitled "LARGE PACKET DAISY CHAIN SERIAL BUS," which in turn claims the benefit of U.S. Provisional Application No. 62/780,561 filed Dec. 17, 2018 and entitled "LARGE PACKET DAISY CHAIN SERIAL BUS," which in turn claims the benefit of U.S. Provisional Application No. 62/851,248 filed May 22, 2019 and entitled "LARGE PACKET DAISY CHAIN SERIAL BUS," the disclosures of which are hereby incorporated by reference in their entireties.

BACKGROUND

Industrial processes, such as industrial painting processes, industrial finishing processes, or other industrial processes often incorporate multiple sensors, actuators, and other devices that are interconnected to exchange information to automate one or more portions of the process. For instance, certain industrial painting processes include interconnected sensors and other devices to monitor and control process parameters, such as fluid pressures, flow rates, tank levels, agitator speeds, and other parameters associated with the painting process. The automated monitoring and control of process parameters can both increase the efficiency of the process and decrease system downtime.

Certain industrial processes, such as painting and finishing processes, can involve fumes or other combustible materials. As such, intrinsic safety of components within such processes is often an important consideration to limit electrical and thermal energy available for ignition. At the same time, as connectivity and the complexity of monitoring and control of industrial processes increases, the communication bandwidth utilized by such systems also increases. Accordingly, both intrinsic safety and communication bandwidth can be important aspects of a communication system that is used for monitoring and control of industrial process parameters.

Moreover, automated monitoring and control of process parameters for an industrial process can involve connecting industrial devices to corresponding controller hardware. Often, controller hardware for communicating with such devices is also physically separate from the devices within the system, and either the devices, the controller hardware, or both may be exposed to fumes or combustible materials. Any industrial devices or controller hardware may be changed over time, which, in turn, affects the setup of any currently connected devices and controller hardware.

SUMMARY

In one example, a method of provisioning a system includes defining one or more virtual peripherals such that each of the virtual peripherals corresponds to a respective device; identifying one or more enabled virtual peripherals based on a process configuration; and identifying, via a communication bus, one or more control modules that are connected in a control system of the system. Each of the control modules includes one or more terminals for connecting to one or more devices. The method further includes linking, via a main controller of the control system, each of the enabled virtual peripherals to a respective terminal of the one or more control modules to form a link between the respective terminal and a corresponding one of the enabled virtual peripherals such that the respective terminal and the corresponding one of the enabled virtual peripherals is a linked pair; generating a provisioning configuration that represents, for each of the enabled virtual peripherals, the link between the respective terminal and the corresponding one of the enabled virtual peripherals; and writing, via the communication bus, the provisioning configuration to each of the control modules. The method further includes connecting, for each of the enabled virtual peripherals, the respective device to the respective terminal consistent with the link between the respective terminal and the corresponding one of the enabled virtual peripherals.

In another example, a system includes one or more devices and a control system that includes a main controller and one or more control modules arranged in a communication bus with the main controller. The main controller is configured to define one or more virtual peripherals such that each of the virtual peripherals corresponds to a respective device; identify one or more enabled virtual peripherals based on a configuration of the system; and identify, via the communication bus, the one or more control modules that are connected in the control system. Each of the control modules includes one or more terminals for connecting to the one or more devices. The main controller is further configured to link each of the enabled virtual peripherals to a respective terminal of the one or more control modules to form a link between the respective terminal and a corresponding one of the enabled virtual peripherals such that the respective terminal and the corresponding one of the enabled virtual peripherals is a linked pair; generate a provisioning configuration that represents, for each of the enabled virtual peripherals, the link between the respective terminal and the corresponding one of the enabled virtual peripherals; and write, via the communication bus, the provisioning configuration to each of the control modules. For each of the enabled virtual peripherals, the respective device is connected to the respective terminal consistent with the link between the respective terminal and the corresponding one of the enabled virtual peripherals.

DETAILED DESCRIPTION

Figure 1:
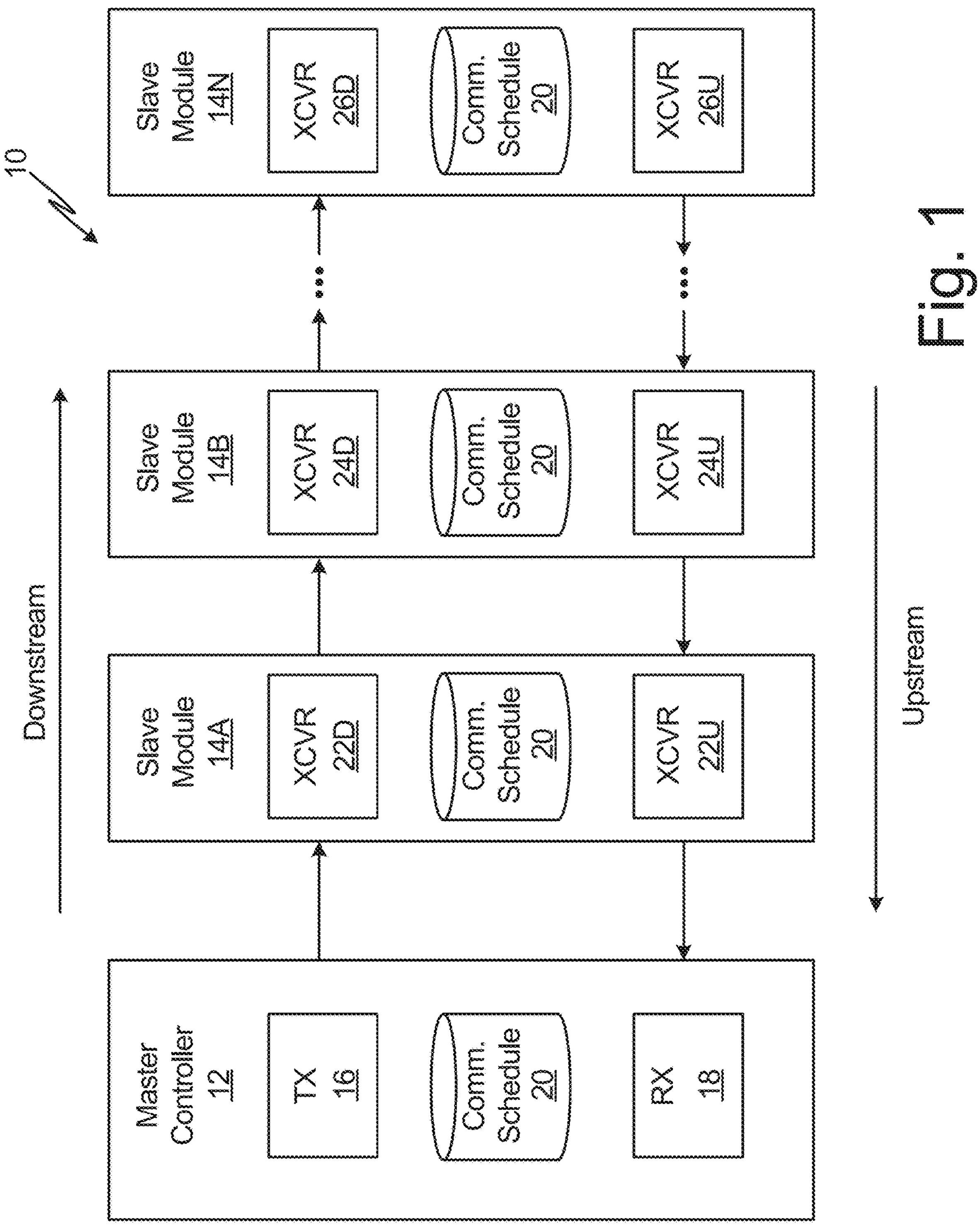
FIG. 1 is a schematic block diagram of an example communication system for use with an industrial process.

According to techniques of this disclosure, a communication system for use with an industrial process (e.g., a painting process, a finishing process, or other industrial process) enables high speed communication of large data packets between a master controller device and a plurality of slave modules. The plurality of slave modules can be (and/or be connected to) components of the industrial process, such as pressure transducers, pumps, actuators, valves, motors, fluid volume sensors, temperature sensors, or other components of an industrial process. The master controller and the slave modules are serially-connected in a daisy chain from the master controller device to a serially-last of the slave modules that is identified by the master controller during a module identification process (e.g., at system initialization or boot-up) and configured as a terminal slave module. Low voltage communication connections, such as one or more of serial communications, optical communications, or other low voltage communication connections can be utilized to facilitate the intrinsic safety of the system, such as for use with industrial processes that may involve combustible fumes (e.g., painting, finishing, or other such processes).

Messages originating from the master controller device travel in a downstream direction from the master controller through each of the plurality of slave modules to the terminal slave module. To increase data throughput, large data packets (e.g., 300 bytes, 500 bytes, or other sizes of data packets) are transmitted from the master controller at a rate of, e.g., one packet every millisecond. The master controller transmits the downstream messages according to a communication schedule that defines an ordered sequence of the messages. In some examples, each of the slave modules stores the communication schedule and utilizes the schedule to identify (and anticipate) received messages, thereby decreasing an amount of header information for each message and processing latency associated therewith, as well as increasing communication bandwidth of the system.

Messages originating from the master controller are received by each of the slave modules as the messages are passed downstream. Each of the slave modules identifies whether the message is associated with the respective slave module, parses and acts upon payload information included in the message, and prepares response information to be included in an upstream message to the master controller. The terminal slave module, in response to receiving a message, produces a new message having the message identifier (e.g., header information including the schedule identification of the message) and transmits the message as a response upstream through the plurality of slave modules to the master controller. Each of the slave modules receives the return messages as they are passed upstream and inserts response information to those messages associated with the respective slave module.

Accordingly, a communication system implementing techniques described herein enables high speed communication of large data packets between the master controller device and the plurality of slave modules. The use of the communication schedule, which can be stored by the master controller and each of the slave modules, enables messages to be directed to (e.g., associated with) multiple slave modules without requiring identification information for each slave module associated with each message to be included in the header information. Moreover, the use of the communication schedule can enable slave modules to efficiently identify and, in certain examples, anticipate the messages, thereby enabling quick response times by the slave modules to decrease processing latency of the system.

According to techniques of this disclosure, industrial components, such as solenoids, flow meters, etc., are abstracted and defined as virtual peripherals in an integrated development environment (IDE) that runs in a control system for a system that can carry out an industrial process (e.g., a painting process, a finishing process, or other industrial process). The abstracted devices are defined in the IDE, which allows all of what is needed to interact with a device to be predefined with respect to a particular application (e.g., a particular industrial process). The virtual peripherals are then mapped to controller hardware (e.g., input/output (I/O) modules of a programmable logic controller (PLC)) in a provisioning process for initializing the system. The provisioning process described herein enforces proper mapping between compatible virtual peripherals and respective terminals of the control modules. The provisioning process utilizes the communication system between the serially connected master controller and slave modules to receive information about the control modules and to communicate a provisioning configuration to each of the control modules.

Because the provisioning process is based on predefined interactions with the industrial devices, the devices can be easily reused across projects. Moreover, the controller hardware is essentially invisible to application software design, so software for the industrial system can be designed without concern for exactly how the devices are connected to the controller hardware. This enables an industrial system implementing techniques of this disclosure to be user-friendly for different types of users (e.g., developers and technicians) and to be relatively flexible with respect to growing the system or other changes to the devices and/or the controller hardware.

FIG. 1 is a schematic block diagram of communication system 10 that can be used with an industrial process, such as a painting process, a finishing process, or other industrial process. As illustrated in FIG. 1, communication system 10 includes master controller 12 and slave modules 14A-14N. Master controller 12 includes downstream transmitter 16 and upstream receiver 18, though in some examples, transmitter 16 and receiver 18 can be combined into a single transceiver. As illustrated in FIG. 1, master controller 12 further stores communication schedule 20, such as within computer-readable memory of master controller 12. In some examples, such as the example of FIG. 1, each of slave modules 14A-14N can also store communication schedule 20, such as in computer-readable memory of slave modules 14A-14N.

Each of slave modules 14A-14N includes a downstream transceiver and an upstream transceiver. That is, as illustrated in FIG. 1, slave module 14A includes downstream transceiver 22D and upstream transceiver 22U. Slave module 14B includes downstream transceiver 24D and upstream transceiver 24U. Slave module 14N includes downstream transceiver 26D and upstream transceiver 26U. It should be understood that, while downstream and upstream transceivers are illustrated in the example of FIG. 1 as separate components, such downstream and upstream transceivers can be implemented in a common communication bus that includes both downstream and upstream transceivers. For instance, downstream transceiver 22D and upstream transceiver 22U of slave module 14A can be implemented as part of a common communication bus that shares, for example, microprocessor(s) and/or computer-readable memory for transmitting downstream and upstream communications. Similarly, any one of slave modules 14B-14N can implement corresponding downstream and upstream transceivers using a common communication bus. Moreover, it should be understood that the letter N with respect to slave modules 14A-14N represents an arbitrary number, such that communication system 10 can include any number of slave modules 14A-14N.

Though not shown in the example of FIG. 1 for purposes of clarity and ease of illustration, master controller 12 and each of slave modules 14A-14N includes one or more processors and computer-readable memory. Examples of the one or more processors can include any one or more of a microprocessor, a digital signal processor (DSP), an application specific integrated circuit (ASIC), a field-programmable gate array (FPGA), or other equivalent discrete or integrated logic circuitry.

Computer-readable memory of master controller 12 and slave modules 14A-14N can be configured to store information within master controller 12 and slave modules 14A-14N during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of master controller 12 and slave modules 14A-14N can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories.

Master controller 12 can be a controller device configured to be communicatively coupled with components of communication system 10, such as slave modules 14A-14N, for monitoring and control of the components during operation of the industrial process. In some examples, master controller 12 includes and/or is operatively coupled to a display device and/or user interface elements (e.g., buttons, dials, graphical control elements presented at a touch-sensitive display, or other user interface elements) to enable user interaction with master controller 12, such as for initialization, monitoring, and/or control of the system. Though not illustrated in the example of FIG. 1, in certain examples, master controller 12 is communicatively coupled to one more remote computing devices, such as via a wired or wireless communications network, or both. Slave modules 14A-14N can be (and/or be connected to) components of the industrial process, such as pressure transducers, pumps, actuators, valves, motors, fluid volume sensors, temperature sensors, or other components of an industrial process.

As illustrated in FIG. 1, master controller 12 and slave modules 14A-14N are electrically and/or communicatively coupled, in series, between master controller 12 and slave module 14N. Slave module 14A is connected to receive downstream communications from master controller 12 and to transmit the downstream communications to slave module 14B via downstream transceiver 22D. Slave module 14A is further connected to receive upstream communications from slave module 14B and to transmit the upstream communications to master controller 12 via upstream transceiver 22U. Slave module 14B is connected to receive downstream communications from slave module 14A and to transmit the communications in a downstream direction (e.g., to or toward slave module 14N) via downstream transceiver 24D. Slave module 14B is further connected to receive upstream communications from (or in a direction from) slave module 14N and to transmit the upstream communications to slave module 14A via upstream transceiver 24U. Slave module 14N is connected to receive downstream communications from (or in a direction from) slave module 14B via downstream transceiver 26D. Slave module 14N is further connected to transmit upstream communications to (or in a direction toward) slave module 14B via upstream transceiver 26U.

Slave module 14A, connected to master controller 12, can therefore be considered an initial slave module. Slave module 14N, located at a terminal end of the series of slave modules, can be considered a terminal slave module. Slave module 14B, connected between initial slave module 14A and terminal slave module 14N, can be considered an intermediate slave module. In some examples, such as when communication system 10 includes additional slave modules connected between slave module 14B and slave module 14N, the additional slave modules can also be considered intermediate slave modules. In certain examples, communication system 10 may not include slave module 14B or other intermediate slave modules connected between slave module 14A (e.g., an initial slave module) and slave module 14N (e.g., a terminal slave module). That is, in some examples, communication system 10 can include master controller 12 and only two slave modules, such as slave module 14A (e.g., an initial slave module) and slave module 14N (e.g., a terminal slave module).

Connections between master controller 12 and slave modules 14A-14N (i.e., between master controller 12 and slave module 14A, as well as between each of slave modules 14A and 14N) can take the form of serial communication connections (e.g., RS-232, RS-485, Serial Peripheral Interface (SPI), or other serial communication connections), optical interface connections, or other forms of communications. In some examples, the use of low-voltage communication interfaces, such as serial interface communications and optical interface communications, can facilitate the intrinsic safety of communications system 10 to limit electrical and/or thermal energy in the presence of, e.g., fumes or other hazardous materials. In certain examples, the communication connections can include a combination of connection types, such as both serial communications and optical communications (e.g., for communications between hazardous and non-hazardous locations). Accordingly, transceiver 16 and receiver 18 of master controller 12, as well as transceivers 22D, 22U, 24D, 24U, 26D, and 26U of slave modules 14A-14N can take the form of any transceiver (or other combination of transmitter and receiver) capable of sending and receiving data according to the communication connections between corresponding modules.

In operation, master controller 12 transmits messages via transmitter 16 in a downstream direction through initial slave module 14A to terminal slave module 14N. In examples where communication system 10 includes intermediate slave modules connected between initial slave module 14A and terminal slave module 14N (e.g., intermediate slave module 14B or other intermediate slave modules), master controller 12 transmits the messages in the downstream direction through initial slave module 14A to terminal slave module 14N via the intermediate slave modules. In examples where communication system 10 does not include intermediate slave modules connected between initial slave module 14A and terminal slave module 14N, master controller 12 transmits the messages via transmitter 16 in the downstream direction through initial slave module 14A to terminal slave module 14N without passing the messages through any intermediate slave modules. Master controller 12 transmits the messages according to communication schedule 20 stored at, e.g., computer-readable memory of master controller 12. Communication schedule 20 defines an ordered sequence of messages and identifiers associated with each of the messages. Communication schedule 20 can define an ordered sequence of, e.g., tens, hundreds, thousands, or other numbers of messages. Each of the messages can be associated with one or more of slave modules 14A-14N.

Messages defined by communication schedule 20 can include both header information and message payload information. Header information can include, e.g., a message class identifier to define a message type. Example message types can include, but are not limited to, an emergency class type, a module identification class type, a module configuration class type, a module schedule class type, a command class type, a status class type, and a bootloader class type. The message class identifier can take the form of, e.g., a sequence of bits (e.g., four bits) or other identifier. Header information can also include, in some examples, header payload information. For instance, header payload information can take the form of a sequence of bits (or other identifier) to identify a destination module, such as a unique identifier of any of slave modules 14A-14N. In some examples, header payload information can identify (e.g., via a bit sequence), a schedule identifier of the corresponding message, such as an indication of the order number of the message within the ordered sequence of messages defined by communication schedule 20. In some examples, header payload information can include additional information, such as optional bits to define additional information associated with the message. In certain examples, message headers include sixteen bits of information, four bits defining a message class type and the remaining twelve bits defining header payload information, though other header sizes are possible. In some examples, header information can include message length information that identifies an amount of data (e.g., a number of bits, a number of bytes, or other indications of an amount or length of the data) included in the message.

Message payload information includes command and/or request information associated with one or more of slave modules 14A-14N. Message payload information can include, e.g., command information to control operation of actuators, valves, pumps, or other components connected to slave modules 14A-14N, and/or requests for status, position, or other information from the components connected to slave modules 14A-14N.

Message payload information can include information associated with any one or more of slave modules 14A-14N. For example, message payload information can include 300 bytes, 400 bytes, 500 bytes, or other amounts of payload information, the payload information corresponding to one or multiple of slave modules 14A-14N. The location of the information corresponding to each associated one of slave modules 14A-14N within the message payload information can be defined by communication schedule 20. For instance, communication schedule 20 can define, for each of the ordered sequence of messages, each one of slave modules 14A-14N that is associated with a respective message, as well as a location within the message (e.g., a memory offset value from a defined location within the message, such as a start of the message, a start of the message payload, or other defined location) that corresponds to message payload information associated with the respective slave module. Communication schedule 20 can further define, in some examples, a local memory address of the corresponding one of slave modules 14A-14N associated with the message, a size of the payload information associated with the message corresponding to the respective slave module (e.g., a length of the portion of the message associated with the slave module), and a memory offset value within upstream messages at which the respective slave module is to insert response information into an upstream message.

As illustrated in FIG. 1, each of slave modules 14A-14N can store communication schedule 20 within computer-readable memory of the respective slave module. In some examples, master controller 12 can transmit communication schedule 20 to each of slave modules 14A-14N, such as during a system initialization mode of operation. In certain examples, master controller 12 can determine communication schedule 20 based on the identity and relative locations of slave modules 14A-14N in the serial connection between master controller 12 and terminal slave module 14N. For instance, master controller 12 can identify the identity and relative location (e.g., order of the serial connection) of each of slave modules 14A-14N during a module identification process, as is further described below.

In operation, downstream messages transmitted by master controller 12 are received by each of slave modules 14A-14N as the downstream messages are passed from master controller 12 to slave module 14N. Each of slave modules 14A-14N identifies the message based on the identifier included with the message by master controller 12, for example within header information of the message indicating the message class type as a command message and the schedule identifier indicating the order number of the message within the ordered sequence of messages defined by communication schedule 20.

Each of slave modules 14A-14N determines, based on communication schedule 20 stored at the respective slave module, whether the message is associated with the respective slave module. In response to determining that the respective slave module is not associated with the message, the respective slave module transmits the message downstream. In response to determining that the respective slave module is associated with the message, the slave module identifies, using communication schedule 20, a location within the message at which information corresponding to the slave module is located, retrieves the information from the corresponding location, identifies whether the slave module is associated with response information (and a location within upstream messages at which the slave module is to insert the response information), and transmits the message downstream. In those cases where the respective slave module is associated with response information for the message, the slave module begins queuing the response information for insertion into a corresponding upstream response message, as is further described below.

Slave module 14N, in the example of FIG. 1, is configured as a terminal slave module (i.e., a serially-last slave module). As such, in response to receiving a downstream message originating from master controller 12, slave module 14N generates a new response message corresponding to the received downstream message. For example, slave module 14N can generate a new response message having header information that identifies the message class as a response (or status) message and includes the schedule identifier of the received downstream message. Slave module 14N, in some examples, can insert response information into the response message (as defined by communication schedule 20), and transmit the response message upstream through the intermediate slave modules (slave module 14B in this example) and the initial slave module (slave module 14A in this example) to master controller 12. In examples where communication system 10 does not include intermediate slave module 14B (or other intermediate slave modules), terminal slave module 14N transmits the response message in the upstream direction through initial slave module 14A to master controller 12 without passing the message through any intermediate slave modules.

The upstream response message is received by each of the slave modules as it is passed upstream to master controller 12. Each respective slave module identifies the message based on the identifier included with the message, such as the schedule identifier included in the header information. Each respective slave module inserts response information into the upstream messages having message identifiers that correspond to previously-received downstream messages that are associated with response information from the respective slave module. Response information is inserted into the upstream message at a location defined by communication schedule 20 stored in the computer-readable memory of the respective slave module.

Accordingly, communication system 10 enables high speed communication of large data packets (e.g., between 300 bytes and 500 bytes) between master controller 12 and slave modules 14A-14N. The use of communication schedule 20 enables downstream messages to include less header information than would otherwise be required to address each message to multiple slave modules, thereby reducing processing latency of the system and increasing system communication bandwidth. In addition, slave modules 14A-14N, including separate upstream and downstream transceivers, can send and receive information simultaneously and asynchronously, thereby further increasing communication bandwidth of the system by enabling slave modules 14A-14N to prepare response information for insertion into upstream communications prior to receiving a corresponding upstream response.

Figure 2:
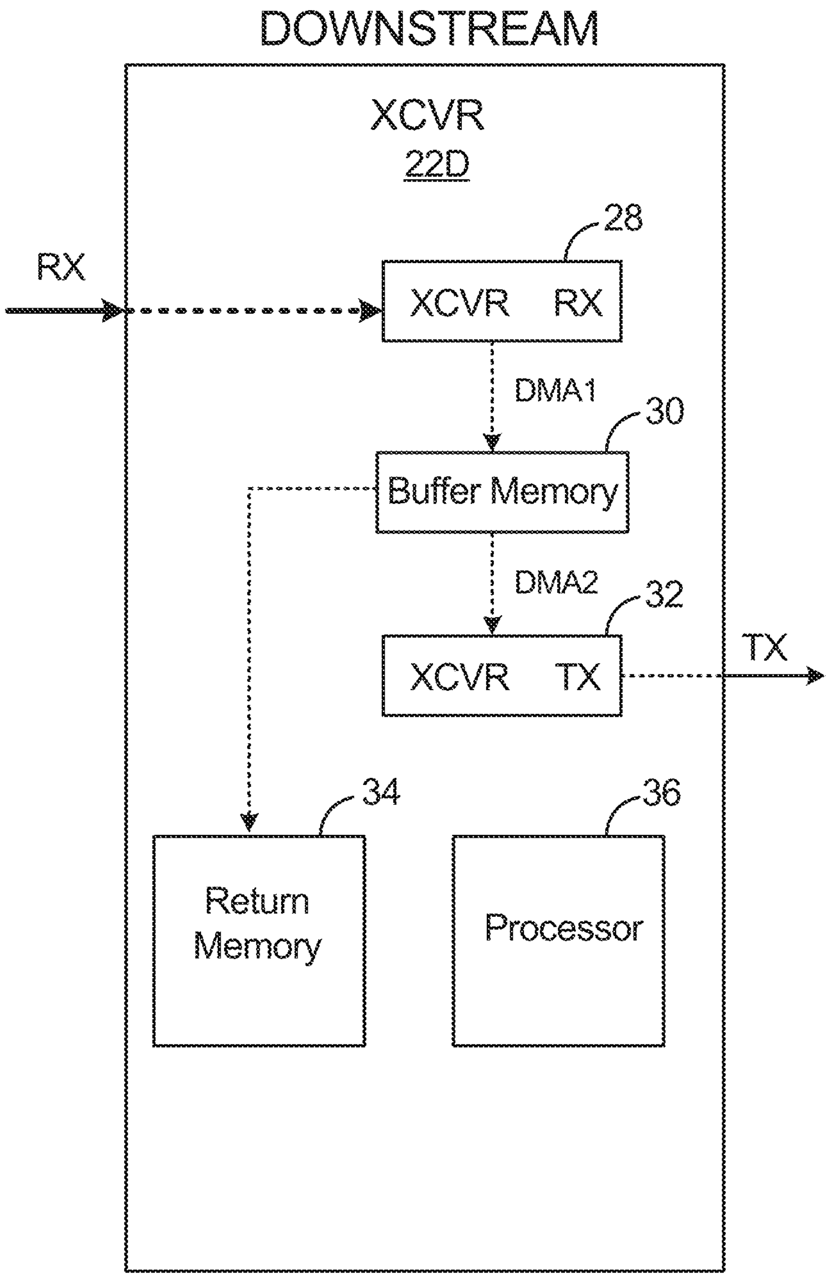
FIG. 2 is a schematic block diagram illustrating further details of a transceiver to receive and transmit downstream communications.

FIG. 2 is a schematic block diagram illustrating further details of downstream transceiver 22D of slave module 14A (FIG. 1) to receive and transmit downstream communications. While the example of FIG. 2 is described below with respect to downstream transceiver 22D, it should be understood that the techniques of FIG. 2 are applicable to any of downstream transceivers 22D, 24D, and 26D.

As illustrated in FIG. 2, downstream transceiver 22D includes receive buffer 28, buffer memory 30, transmit buffer 32, return memory 34, and processor 36. Downstream communication data received by downstream transceiver 22D is passed to receive buffer 28. Data within receive buffer 28 is moved to buffer memory 30 using direct memory access (DMA), illustrated in FIG. 2 as DMA1 (e.g., a first DMA). The memory location within buffer memory 30 is automatically incremented by DMA1 and the size of the memory is set to a DMA block that is larger than a defined size of incoming messages (e.g., 300 bytes, 500 bytes, or other sizes of messages). An event is triggered, e.g., as managed by processor 36, when memory transfer from receive buffer 28 to buffer memory 30 is initiated. The triggered event increments a byte counter and a second DMA transfer (illustrated in FIG. 2 as DMA2) moves data from buffer memory 30 to transmit buffer 32. Data within buffer memory 30 is transmitted downstream toward terminal slave module 14N (FIG. 1).

The byte counter is configured to interrupt after a first threshold number of bytes is received, the first threshold number of bytes corresponding to a defined size of header information included at a beginning of downstream communications (e.g., one byte, two bytes, or other whole or fractional numbers of bytes). In some examples, processor 36 performs a cyclical redundancy check (CRC) on the received header information and payload information against a fixed-length check value (e.g., a bit sequence) included in the header information. In response to determining that the check value satisfies the CRC, processor 36 parses the received header information to identify the schedule identifier of the message that indicates the order of the message within the ordered sequence of messages defined by communication schedule 20 (FIG. 1). In response to determining that the check value does not satisfy the CRC, processor 36 can transmit the received message downstream without further processing or can refrain from both processing the message and transmitting the message downstream.

Processor 36 identifies, based on information included in communication schedule 20, a starting location of information within the message that is associated with slave module 14A and a length (or size) of the data within the message associated with slave module 14A. The byte counter is reconfigured to interrupt after the length (or size) of the data within the message associated with slave module 14A is received, and data within the received message from the starting location to the identified length (or size) is moved into memory during the interrupt for processing by slave module 14A.

Figure 3:
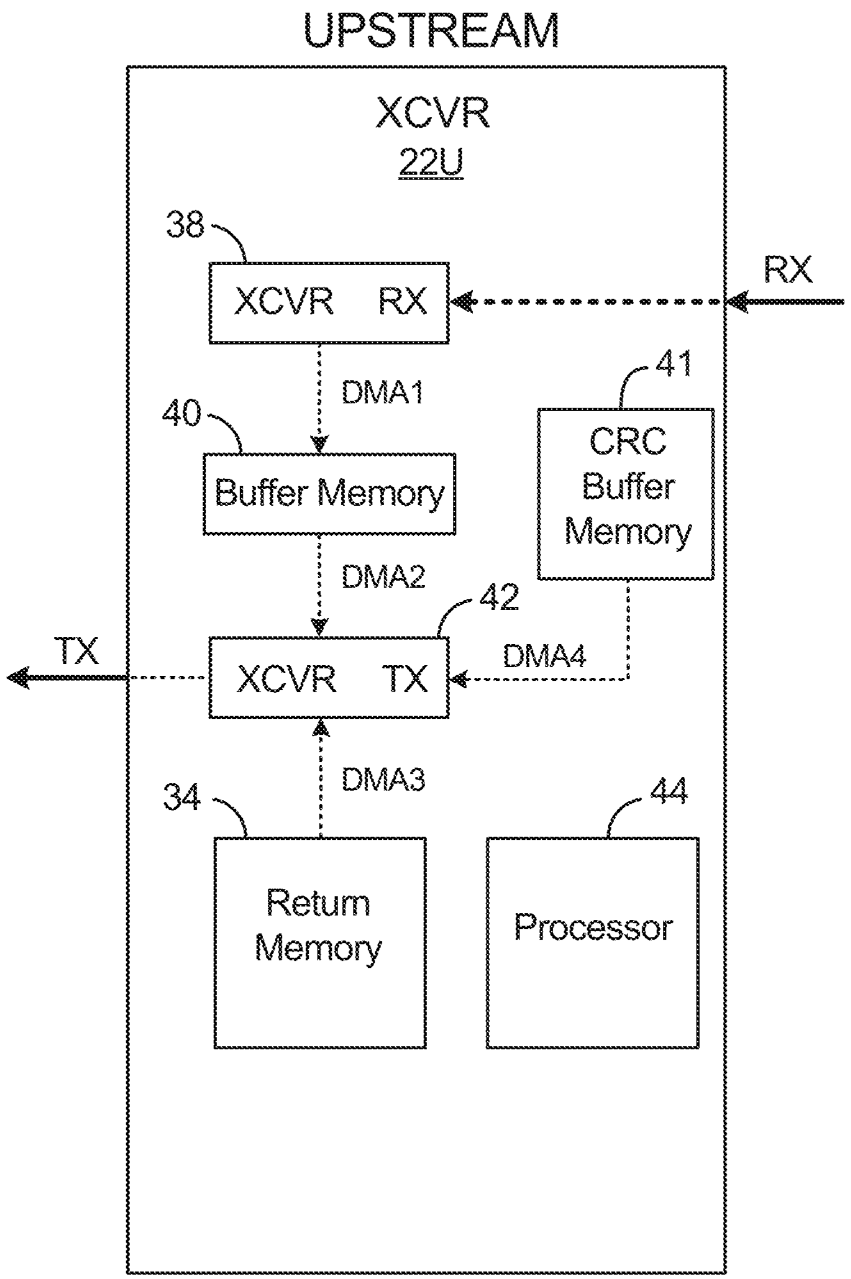
FIG. 3 is a schematic block diagram illustrating further details of a transceiver to receive and transmit upstream communications.

FIG. 3 is a schematic block diagram illustrating further details of upstream transceiver 22U of slave module 14A (FIG. 1) to receive and transmit upstream communications. While the example of FIG. 3 is described below with respect to upstream transceiver 22U, it should be understood that the techniques of FIG. 3 are applicable to any of upstream transceivers 22U, 24U, and 26U.

As illustrated in FIG. 3, upstream transceiver 22U includes receive buffer 38, buffer memory 40, CRC buffer memory 41, transmit buffer 42, and processor 44. In the example of FIG. 3, upstream transceiver 22U shares return memory 34 with downstream transceiver 22D (e.g., implemented as part of a common communications bus), though in other examples, upstream transceiver 22U can include separate return memory, the information within return memory of downstream transceiver 22D being moved to the separate return memory by, e.g., a processor of slave module 14A. Similarly, though upstream transceiver 22U is illustrated as having processor 44 that is separate from processor 36 (FIG. 2) of downstream transceiver 22D, in other examples, upstream transceiver 22U and downstream transceiver 22D can share a common processor.

Upstream data received by upstream transceiver 22U is passed to receive buffer 38. Data within receive buffer 38 is moved to buffer memory 40 using DMA, illustrated in FIG. 3 as DMA1. The memory location within buffer memory 38 is automatically incremented by the DMA and the size of the memory is set to a DMA block that is larger than a defined size of incoming messages (e.g., 300 bytes, 500 bytes, or other sizes). An event is triggered, e.g., as managed by processor 44, when memory transfer from receive buffer 38 to buffer memory 40 is initiated. The triggered event increments a byte counter and a second DMA transfer (illustrated in FIG. 3 as DMA2) moves data from buffer memory 40 to transmit buffer 42. Data within buffer memory 42 is transmitted upstream toward master controller 12 (FIG. 1).

The byte counter is configured to interrupt after a first threshold number of bytes is received, the first threshold number of bytes corresponding to a defined size of header information included at a beginning of upstream communications (e.g., one byte, two bytes, or other whole or fractional numbers of bytes). Processor 44 identifies, based on information included in communication schedule 20, a starting location within the upstream message that is associated with return information for slave module 14A and a length (or size) of the associated return information. The byte counter is reconfigured to interrupt after a second threshold number of bytes are received, the second threshold number of bytes corresponding to a number of bytes between the starting location of the upstream message and the location within the message associated with slave module 14A. In response to the interrupt, a length of data associated with the return information is transferred from return memory 34 to transmit buffer 42. In some examples, DMA2 is reconfigured (e.g., by processor 44) to transfer the data from return memory 34 to transmit buffer 42. In other examples, such as the example of FIG. 3, a third DMA (illustrated as DMA3) is utilized to transfer the data from return memory 34 to transmit buffer 42. The byte counter is again reconfigured to interrupt after a third threshold number of bytes, the third threshold number of bytes corresponding to the length of data (i.e., number of bytes of data) associated with the return information.

Data within transmit buffer 42 is also moved to CRC buffer memory 41. Processor 44 performs a CRC on data within transmit buffer 42 (i.e., data moved to transmit buffer 42 from buffer memory 40 via DMA 1 and data moved to transmit buffer 42 from return memory 34 via DMA3). The interrupt after transfer of data from transmit buffer 42 initiates a DMA transfer of the calculated CRC to transmit buffer 42 (e.g., at the end of the upstream message or at another defined location within transmit buffer 42), illustrated in FIG. 3 as DMA 4. In addition, processor 44 compares the calculated CRC against CRC criteria, such as a fixed-length check value included in the received upstream message data.

In response to determining that the calculated CRC does not satisfy the CRC criteria, processor 44 causes transfer of a failure node identifier (FNID) corresponding to slave module 14A from CRC buffer memory to transmit buffer 42 (e.g., at a location after the calculated CRC or at another defined location within transmit buffer 42). The failure node identifier corresponding to slave module 14A identifies slave module 14A and indicates that upstream communications through transceiver 22U of slave module 14A did not satisfy the CRC check, therefore indicating that communications from slave module 14A may include erroneous communications data. In response to determining that the calculated CRC satisfies the CRC criteria, processor 44 does not cause the transfer of the failure node identifier corresponding to transceiver 22U to transmit buffer 42.

In certain examples, each of transceivers slave modules 14A-14N can insert a separate failure node identifier in response to determining that communications through the respective one of transceivers 22U-26U did not satisfy the CRC criteria. In other examples, each of slave modules 14A-14N can update a single failure node identifier (e.g., a single location within corresponding upstream communications) with a failure node identifier corresponding to the respective one of slave modules 14A-14N. In such examples, the failure node identifier received at master controller 12 (FIG. 1) can indicate the one of slave modules 14A-14N that is furthest upstream (e.g., nearest to master controller 12 in the communications path) and is associated with potentially erroneous communication data. Master controller 12 can, in certain examples, utilize communication data received from those of slave modules 14A-14N that are upstream of the slave module corresponding to the failure node identifier, and can ignore (or otherwise refrain from utilizing) data received from those of slave modules 14A-14N that are downstream of the slave module corresponding to the failure node identifier. Data within transmit buffer 42, including CRC and failure node identification data, is transmitted as part of the upstream message.

FIGS. 4A-4E are schematic block diagrams illustrating an example module identification process for use with communication system 10. As illustrated and described with respect to the examples of FIGS. 4A-4E, master controller 12 can identify a relative location of slave modules 14A-14N within the serial connection of slave modules 14A-14N (i.e., an order of the serial connections of slave modules 14A-14N) as well as identity information (e.g., a type, model, serial number, or other identity information) of slave modules 14A-14N. In addition, master controller 12 can determine which of slave modules 14A-14N is a serially-last of slave modules 14A-14N, and can configure the serially-last of slave modules 14A-14N as a terminal slave module that generates return messages and transmits the return messages upstream. As such, the techniques of FIGS. 4A-4E enable any number and any type of slave modules to be connected in series with master controller 12 without pre-provisioning slave modules 14A-14N or master controller 12 with the connection order. Moreover, any one of slave modules 14A-14N can be configured to act as a terminal slave module, such configuration being activated by master controller 12 based on the connection order implemented for the specific application and/or industrial process.

The identification process described with respect to FIGS. 4A-4E can be implemented by master controller 12 during, e.g., an initialization phase of operation of communication system 10, such as during boot-up or power-on of master controller 12. In some examples, the identification process can be repeated during operation of communication system 10 to identify whether new slave modules have been added, whether any of slave modules 14A-14N have been removed, and/or whether any of the slave modules are in a failure state or otherwise unable to communicate.

Figure 4A:
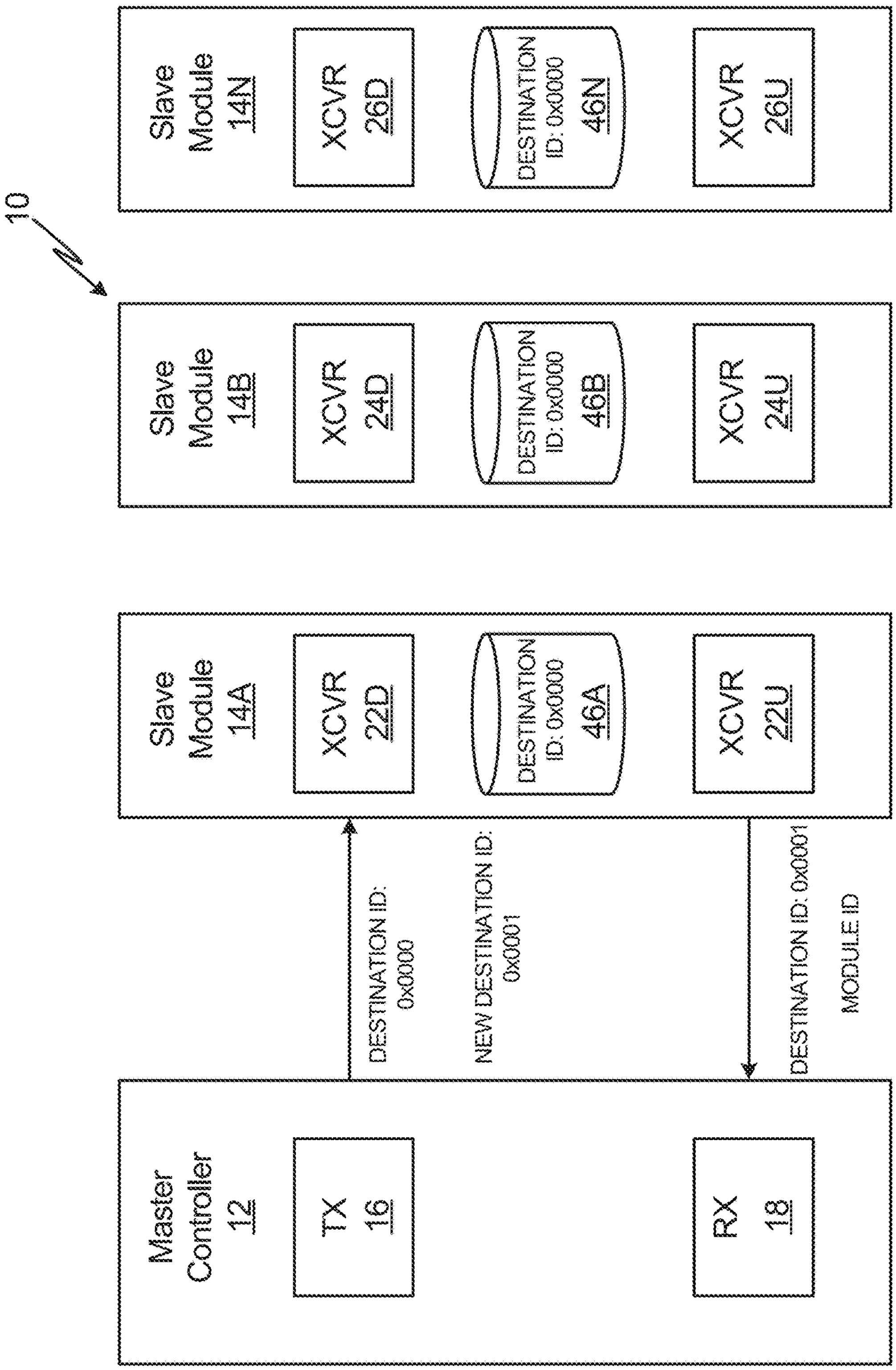
FIGS. 4A-4E are schematic block diagrams illustrating an example module identification process for use with the communication system.

Each of slave modules 14A-14N can store, e.g., at computer-readable memory, a destination identifier that identifies the respective slave module. For example, as illustrated in FIG. 4A, slave module 14A can store destination identifier (ID) 46A, slave module 14B can store destination ID 46B, and slave module 14N can store destination ID 46N. Destination IDs 46A-46N serve as unique identifiers of the respective slave modules within communication system 10. As such, master controller 12 can, in some examples, transmit messages downstream that include header information identifying a corresponding one of slave modules 14A-14N via destination IDs 46A-46N.

The example of FIG. 4A illustrates communication system 10 in an initial state, e.g., prior to initialization by master controller 12. As illustrated in FIG. 4A, each of slave modules 14A-14N can be pre-provisioned to store a destination ID having a defined value that corresponds to an uninitialized (or unidentified) module. For instance, as in the example of FIG. 4A, each of slave modules 14A-14N can be pre-provisioned to store a destination ID having a hexadecimal value of 0x0000, though any defined identifier (using any alphanumeric code) can be pre-defined as corresponding to an uninitialized module.

To identify and initialize slave modules 14A-14N, master controller 12 transmits an identification message downstream that is addressed to the defined destination ID corresponding to uninitialized modules (0x0000, in this example). For instance, master controller 12 can transmit a message downstream having header information that identifies the message as an identification class type (e.g., a bit sequence defined as an identification class type message) and a destination ID corresponding to uninitialized modules. In addition, the identification class type header information can include a commanded destination ID. Slave modules 14A-14N can be configured to store (e.g., in memory) the commanded destination ID as the destination ID associated with the respective slave module.

Slave modules 14A-14N can be configured to respond to identification class messages having a destination ID that matches the destination ID stored at the respective slave module without re-transmitting the identification class message downstream. Slave modules 14A-14N can be further configured to re-transmit downstream those identification class messages that do not match the destination ID stored at the respective slave module, and to re-transmit upstream all received upstream identification class messages.

Responses to identification class modules, as illustrated in FIG. 4A, can include the newly-stored destination ID of the respective slave module, as well as identity information of the respective slave module. Identity information can include, e.g., module type information, module version information, module serial number information, or other information identifying the respective slave module.

As illustrated in the example of FIG. 4A, in response to receiving the identification class message transmitted downstream by master controller 12 having the destination ID corresponding to uninitialized modules (0x0000, in this example), slave module 14A determines that the destination ID 0x0000 matches the value of destination ID 46A stored in memory of slave module 14A. Slave module 14A, in this example, identifies the commanded destination ID within the received message as having a hexadecimal value of 0x0001. Slave module 14A stores the value of 0x0001 as destination ID 46A and transmits the newly-stored value of 0x0001 and identity information of slave module 14A upstream to master controller 12.

Master controller 12, in response to receiving the response message from slave module 14A, stores the destination ID 0x0001 and the received identity information of slave module 14A received in the response within memory of master controller 12. Master controller 12 can identify the relative order of slave modules 14A-14N in the series connection as the order of identity information received during the initialization process. As such, master controller 12 can identify (and store) the identity information received from slave module 14A as a serially-first slave module (i.e., an initial slave module) within the series connection of slave modules 14A-14N.

Figure 4B:
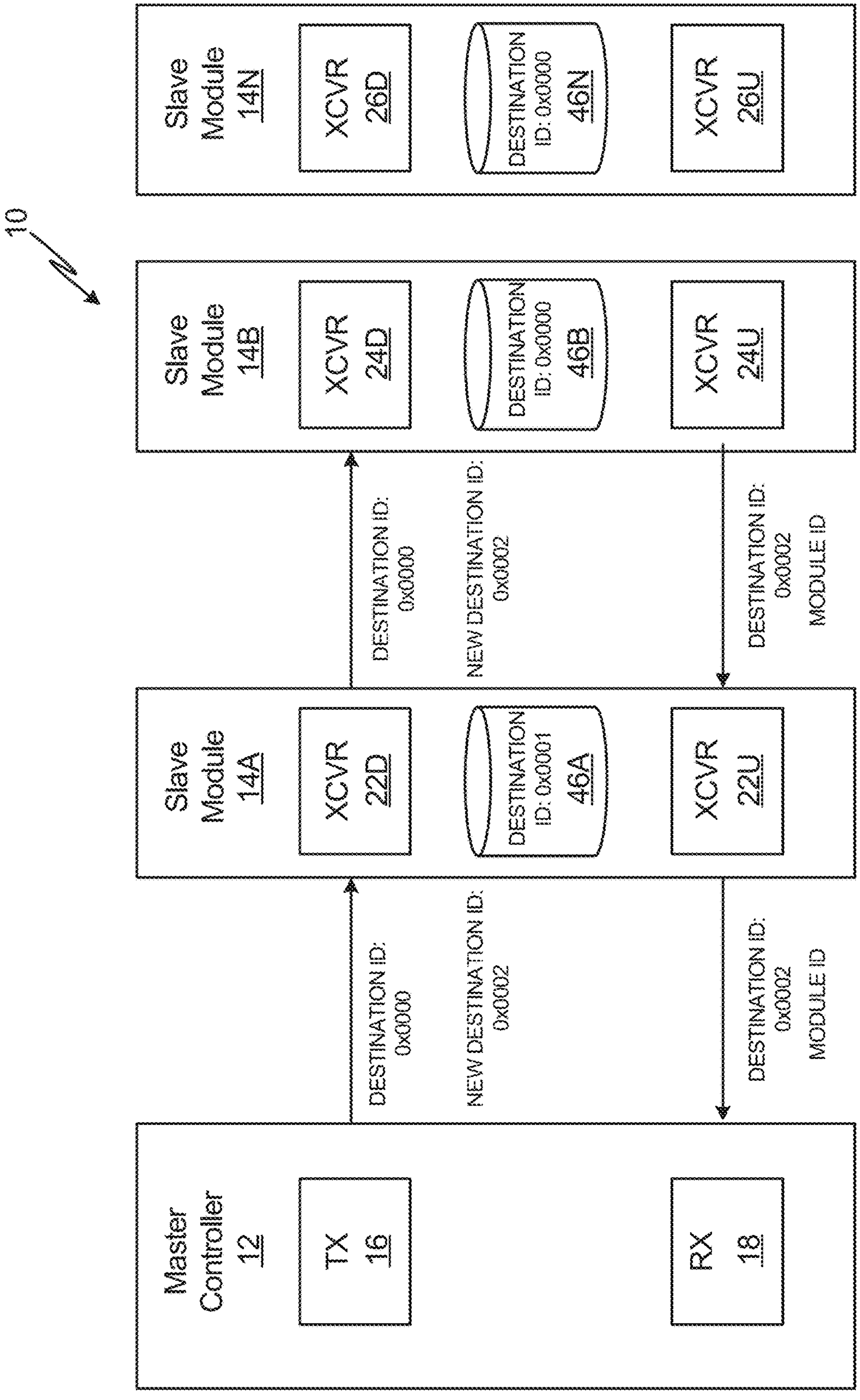

As illustrated in FIG. 4B, slave module 14A stores destination ID 46A having a value of 0x0001 according to the commanded destination ID transmitted to slave module 14A in the example of FIG. 4A. Master controller 12, in response to receiving the response message from slave module 14A, transmits a new identification class message downstream. The new identification class message includes the destination ID defined as corresponding to uninitialized modules and a commanded destination ID that is different than the destination ID associated with slave module 14A. For instance, as illustrated in FIG. 4B, master controller 12 can transmit the identification message including a destination ID having a value of 0x0000 (i.e., corresponding to uninitialized modules in this example) and a commanded destination ID having a value of 0x0002. Though the example of FIG. 4B illustrates master controller 12 as incrementing the commanded destination ID by a value of one, it should be understood that any unique commanded destination ID can be utilized (i.e., any commanded destination ID that is not associated with a slave module within memory of master controller 12).

Slave module 14A, in the example of FIG. 4B, receives the identification class message including the destination ID having a value of 0x0000, compares the destination ID to the stored value of destination ID 46A, and determines that the destination ID included in the downstream message does not match the stored value of destination ID 46A (i.e., a value of 0x0001 in this example). In response, slave module 14A re-transmits the identification class message downstream.

Slave module 14B, as illustrated in FIG. 4B, receives the identification class message from slave module 14A and compares the value of the destination ID included in the message to the value of destination ID 46B stored in memory of slave module 14B. In this example, slave module 14B determines that the value of the destination ID included in the downstream message (i.e., 0x0000) matches the stored value of destination ID 46B (i.e., 0x0000). In response, slave module 14B stores the value of 0x0002 as destination ID 46B, and transmits the newly-stored value of 0x0002 and identity information of slave module 14B upstream toward master controller 12. Slave module 14A receives the upstream identification class message and re-transmits the message upstream to master controller 12.

Master controller 12, in response to receiving the response message from slave module 14B, stores the destination ID 0x0002 and the received identity information of slave module 14B within memory of master controller 12. Master controller 12 further identifies slave module 14B as next in the relative order of the plurality of slave modules in the series connection (i.e., next with respect to slave module 14A identified as serially-first in the example of FIG. 4A).

Figure 4C:
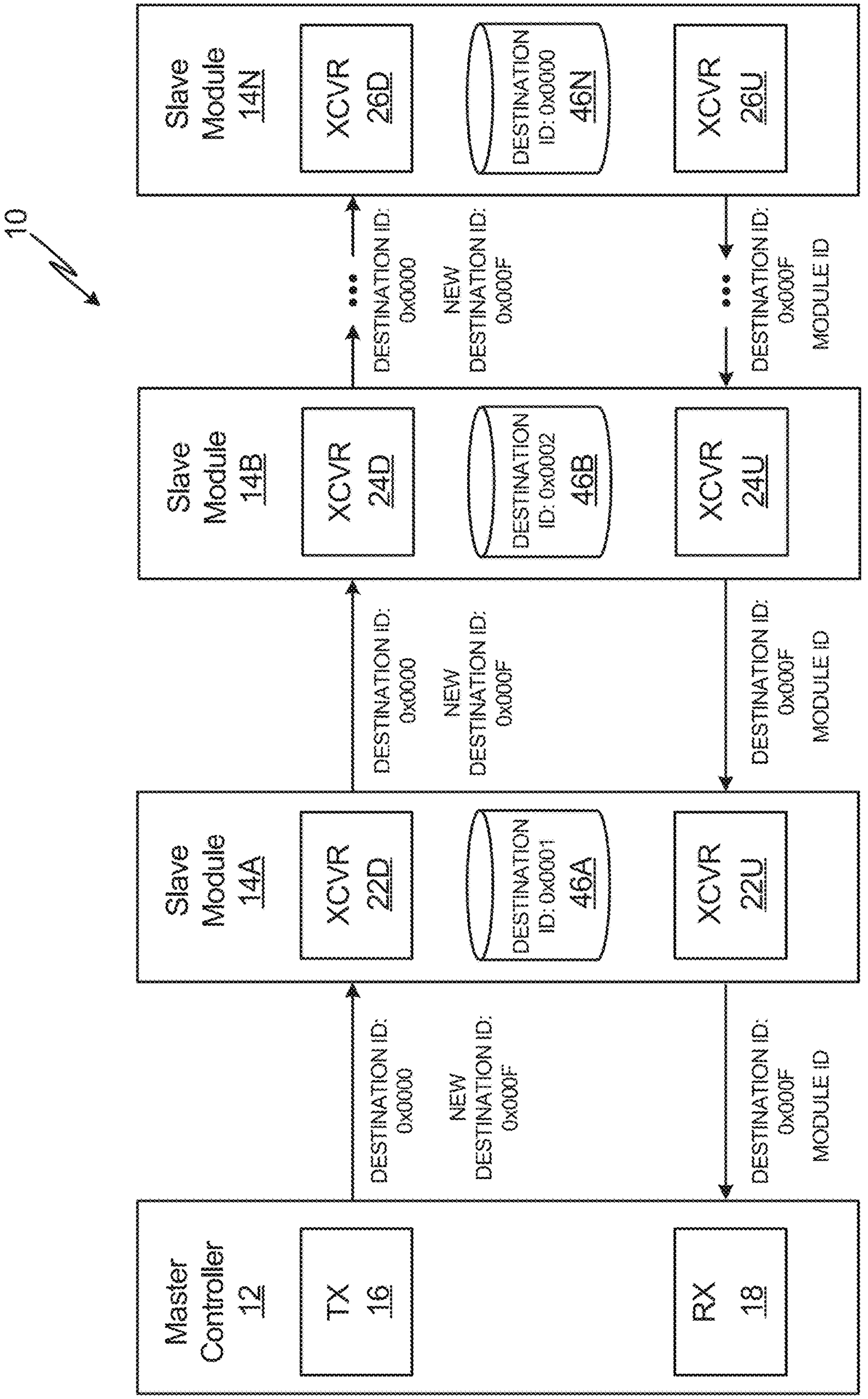

As illustrated in FIG. 4C, slave module 14A stores destination ID 46A having a value of 0x0001, and slave module 14B stores destination ID 46B having a value of 0x0002. Master controller 12, in response to receiving the response message from slave module 14B, transmits a new identification class message downstream. The new identification class message includes the destination ID having a value of 0x0000, defined in this example as corresponding to uninitialized modules, as well as a commanded destination ID having a hexadecimal value of 0x000F (i.e., corresponding to decimal value fifteen). Slave module 14A receives the downstream identification class message, determines that the included destination ID (0x0000) does not match the stored value of destination ID 46A (i.e., 0x0001), and re-transmits the message downstream. Slave module 14B receives the downstream identification class message, determines that the included destination ID (0x0000) does not match the stored value of destination ID 46B (0x0002), and re-transmits the message downstream. Slave module 14N receives the downstream identification class message, determines that the included destination ID (0x0000) matches the stored value of destination ID 46N (0x0000). In response, slave module 14N stores the value of the commanded destination ID (0x000F) as destination ID 46N, and transmits a response upstream, the response including the value of the newly-stored destination ID (0x000F) and identity information of slave module 14N.

Slave modules 14B and 14A, in turn, receive the upstream identification class message and re-transmit the message upstream. Master controller 12 receives the upstream response and stores the destination ID 0x000F and the received identity information of slave module 14N within memory of master controller 12. Master controller 12 further identifies slave module 14N as next in the relative order of the plurality of slave modules 14A-14N.

Figure 4D:
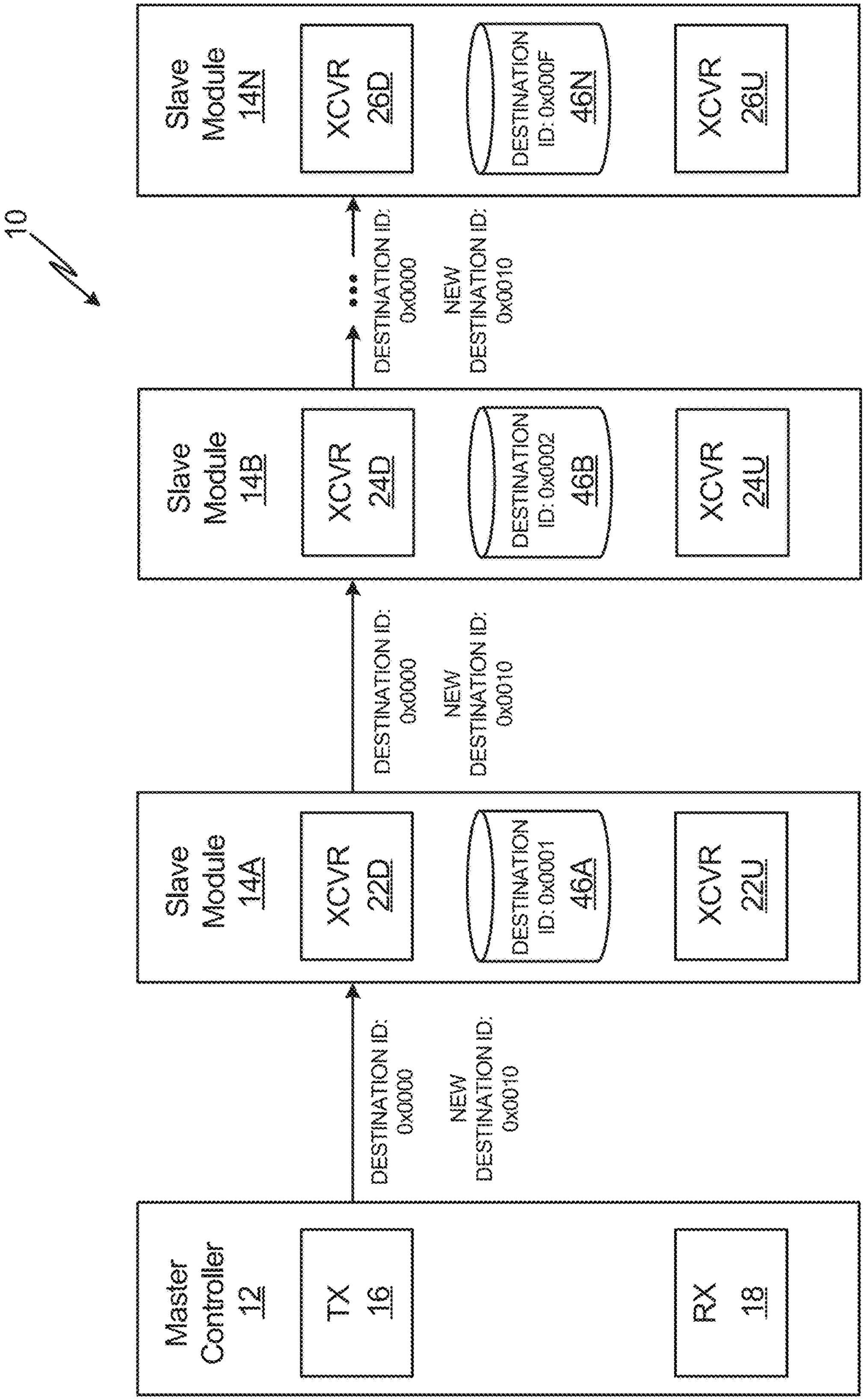

As illustrated in FIG. 4D, slave module 14A stores destination ID 46A having a value of 0x0001, slave module 14B stores destination ID 46B having a value of 0x0002, and slave module 14N stores destination ID 46N having a value of 0x000F. Master controller 12, in response to receiving the response message from slave module 14N, transmits a new identification class message downstream. The new identification class message includes the destination ID having a value of 0x0000, defined in this example as corresponding to uninitialized modules, as well as a commanded destination ID having a hexadecimal value of 0x0010 (i.e., corresponding to decimal value sixteen).

Each of slave modules 14A-14N receives the downstream identification class message, determines that the included destination ID (0x0000) does not match the stored value of the destination ID for the respective slave module, and retransmits the message downstream. Slave module 14N, in the example of FIG. 4D, is the serially-last slave module, and is therefore not connected to any downstream slave module. As such, no slave module responds to the downstream message in this example, and no upstream response is transmitted to master controller 12.

Master controller 12, in response to determining that a threshold amount of time has elapsed without receiving a response message (e.g., one second, two seconds, three seconds, or other threshold amounts of time), can determine that slave module 14N (i.e., a last slave module to respond) is the serially-last slave module. In some examples, master controller 12 can retransmit the identification class message having the destination ID corresponding to uninitialized modules once, twice, three times, or more, to determine whether a response is received within the threshold amount of time. In response to determining that slave module 14N (i.e., the last slave module to respond) is the serially-last slave module, master controller 12 stores the destination ID corresponding to slave module 14N (0x000F in this example) as corresponding to a terminal slave module.

Figure 4E:
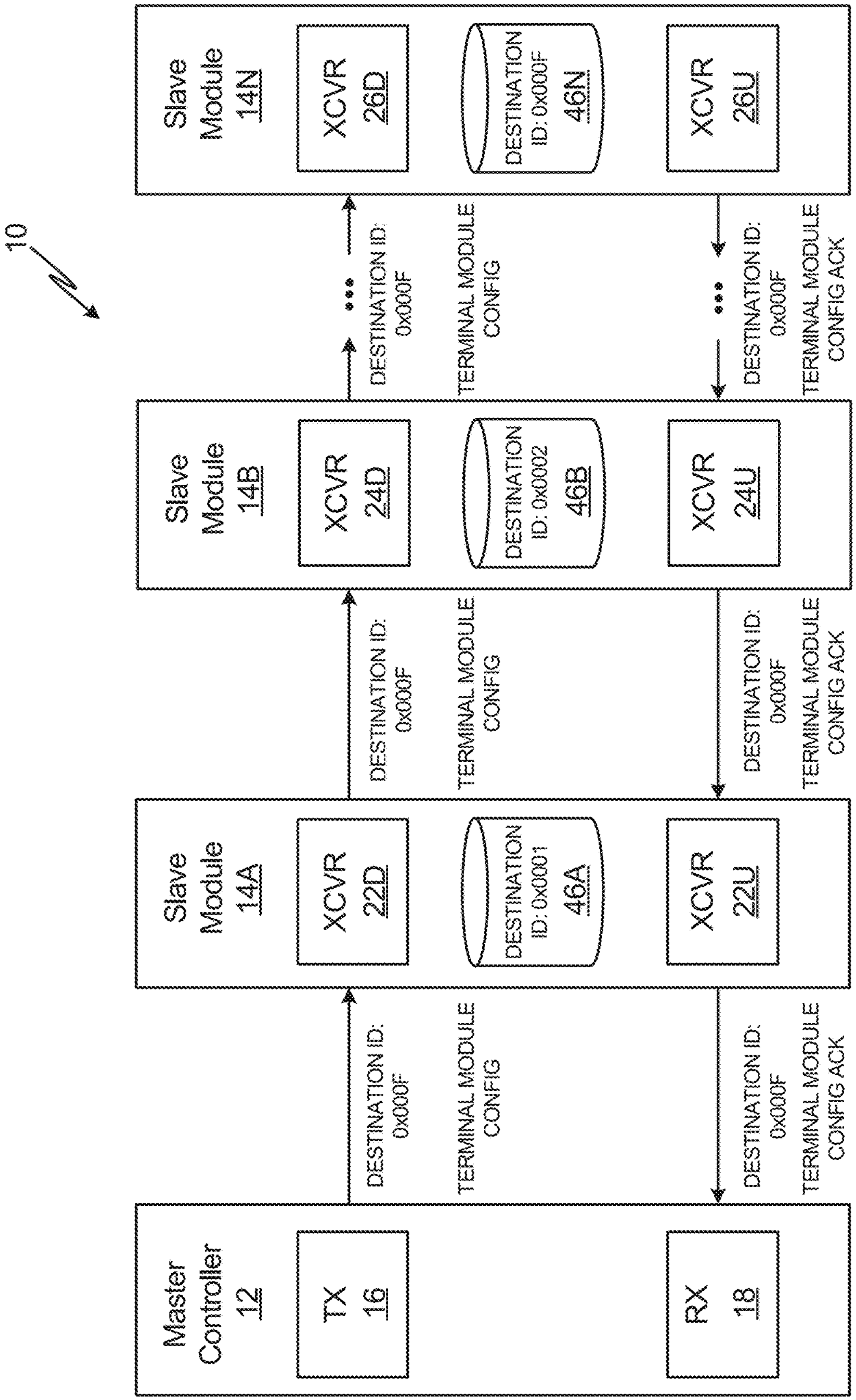

As illustrated in FIG. 4E, in response to determining that slave module 14N is a terminal slave module in communication system 10, master controller 12 transmits an identification class message downstream, the identification class message including a destination ID corresponding to slave module 14N (0x000F) and a terminal module configuration command. The identification class message, having the destination ID that does not match either of slave modules 14A or 14B, is transmitted downstream through slave modules 14A and 14B to slave module 14N.

In response to receiving the identification class message including the destination ID that matches destination ID 46N (0x000F) and the terminal module configuration command, slave module 14N reconfigures to operate as a terminal slave module. As such, slave module 14N is configured within communication system 10 to generate return messages in response to receiving downstream command messages, and to transmit the return messages upstream toward master controller 12.

Accordingly, master controller 12 can determine an identity of each of slave modules 14A-14N and a relative order of the serial connections of slave modules 14A-14N within communication system 10. As such, any type, number, and order of slave modules can be connected in series with master controller 12 without pre-provisioning slave modules 14A-14N or master controller 12 with the slave module types, the number of slave modules, or the connection order of the slave modules within communication system 10.

Communication system 10, implementing techniques of this disclosure, can enable high speed communication of large data packets between a master controller device and a plurality of slave modules over low voltage connections that facilitate intrinsic safety within an industrial process that may involve combustible fumes or other hazardous materials. The use of a communication schedule, which can be stored by the master controller and each of the slave modules, enables messages to be associated with multiple slave modules without requiring identification information for each slave module associated with each message to be included in the header information. Moreover, the use of the communication schedule can enable slave modules to efficiently identify and, in certain examples, anticipate the messages, thereby enabling quick response times by the slave modules to decrease processing latency of the system. As such, techniques of this disclose can enable high speed communications by decreasing system processing latency and increasing available bandwidth in a communication system that may be used with an industrial process that requires intrinsic safety of system components.

Figure 5:
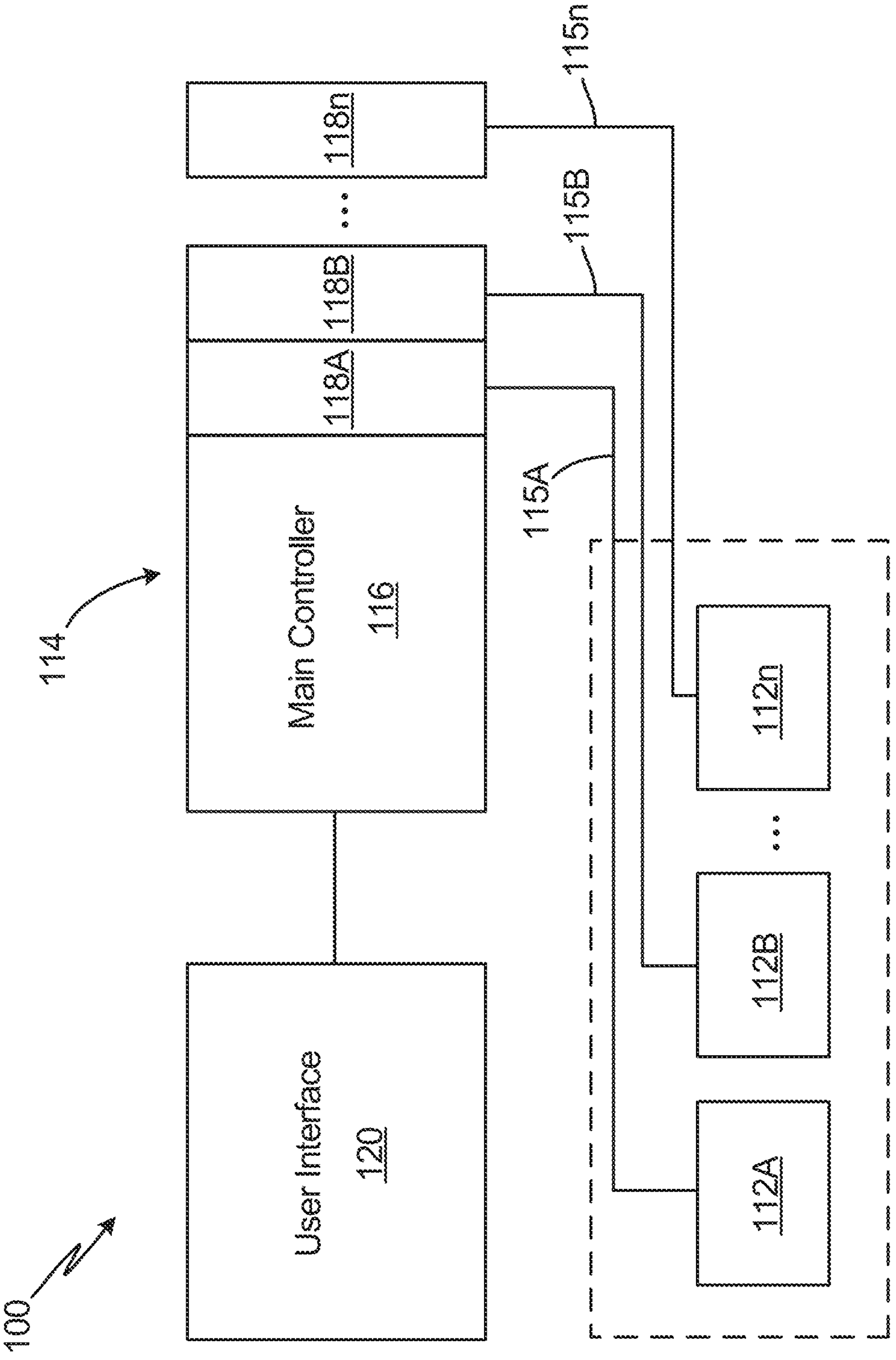
FIG. 5 is a schematic block diagram of an example system showing connections between devices and a control system that includes the communication system of FIG. 1.
Figure 6:
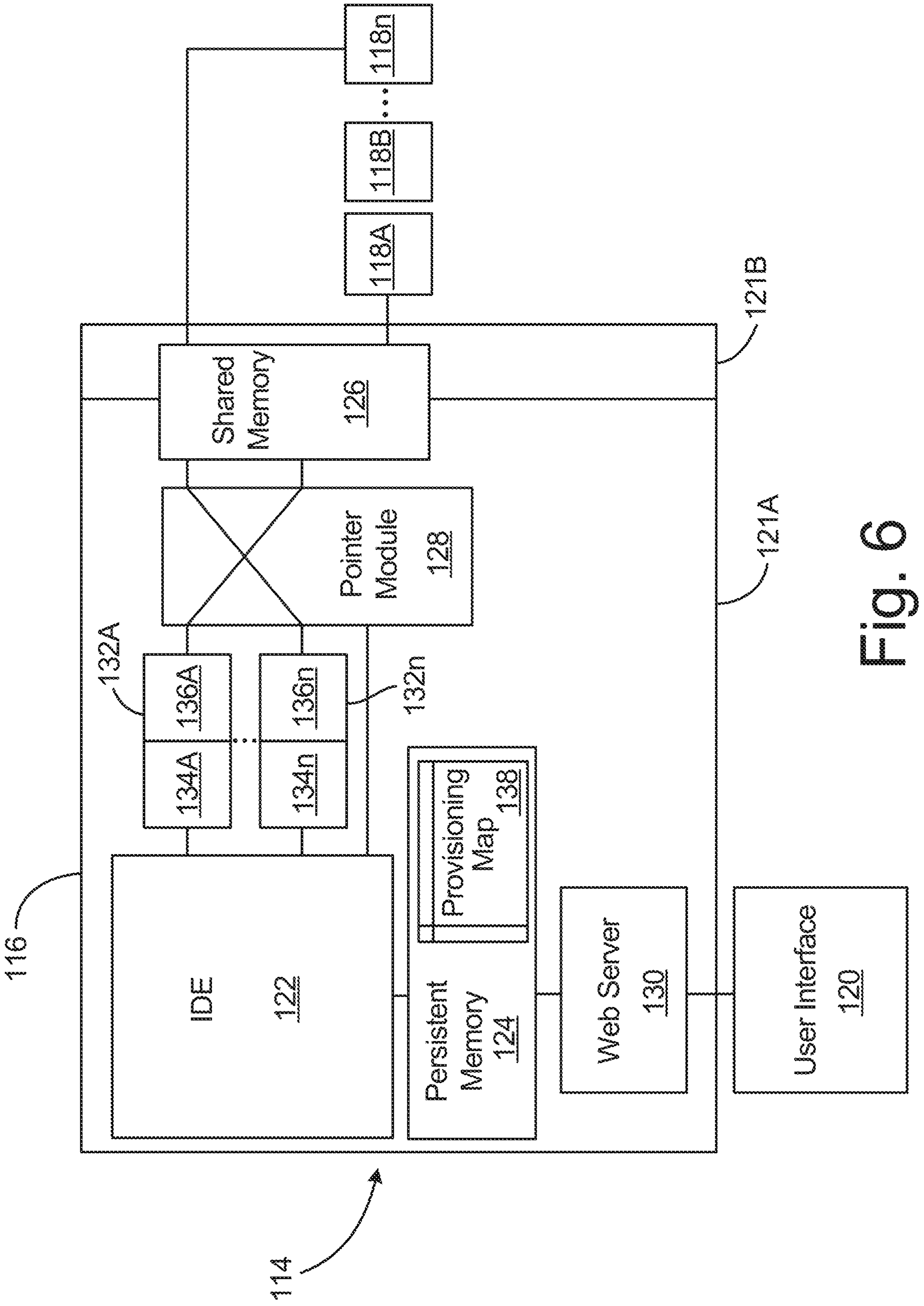
FIG. 6 is a schematic block diagram illustrating details of the control system that correspond to a provisioning process for the system.

FIGS. 5 and 6 will be described together. FIG. 5 is a schematic block diagram of system 100 showing connections between devices 112A-112*n* and control system 114, which includes communication system 10 of FIG. 1. System 100 can be an industrial system for performing an industrial process, such as a painting process, a finishing process, or other industrial process.

As illustrated in FIG. 5, system 100 includes devices 112A-112*n*, control system 114, and connections 115A-115*n*. Control system 114 includes main controller 116, control modules 118A-118*n*, and user interface 120. Consistent with the convention used above, the letter "n" with respect to devices 112A-112*n*, connections 115A-115*n*, control modules 118A-118*n*, etc., represents an arbitrary number, such that system 100 can include any number of devices 112A-112*n*, connections 115A-115*n*, and control modules 118A-118*n*.

Devices 112A-112*n* are components of system 100, i.e., industrial components. Devices 112A-112*n* can be, e.g., actuators or sensors. Ones of devices 112A-112*n* that are sensors can represent inputs of system 100, and ones of devices 112A-112*n* that are actuators can represent outputs of system 100. For example, any one or more of devices 112A-112*n* can be flow meters, pressure transducers, pumps, actuators, solenoids, other valves, motors, fluid volume sensors, temperature sensors, or other components of an industrial process. Devices 112A-112*n* can have any suitable organization or order within system 100 for performing an industrial process.

Each of devices 112A-112*n* is configured to receive one or more electrical or optical connections (e.g., connections 115A-115*n*, as described in greater detail below). Each of devices 112A-112*n* can be configured to receive and/or transmit a signal (i.e., data, such as status or command data) and/or power via a connection or connections to, e.g., corresponding ones of control modules 118A-118*n*. Individual devices 112A-112*n* can receive an input, which can be defined by a range or maximum accepted voltage, current, and/or power. Different ones of devices 112A-112*n* can accept different voltages (or current or power) or the same voltage (or current or power), depending on the individual device requirements. Similarly, individual devices 112A-112*n* can transmit signals as an output, which can be defined by a range or maximum voltage, current, and/or power. Different ones of devices 112A-112*n* can transmit signals at different voltages (or current or power) or the same voltage (or current or power), depending on the individual device requirements. In some examples, individual devices 112A-112*n* can also receive or transmit optical signals, such as fiber optic signals.

Although three devices 112A-112*n* are illustrated in FIG. 5, it should be understood that other examples of system 100 can include more or fewer devices 112A-112*n*. Moreover, the number of devices 112A-112*n* can be based on a desired configuration for a process that is carried out by system 100. Accordingly, system 100 can include any suitable number of devices 112A-112*n*. Depending on the process associated with system 100, any one or more of devices 112A-112*n* may be in hazardous locations, such as locations where devices 112A-112*n* are exposed to flammable or explosive vapors.

Control system 114 includes main controller 116 and control modules 118A-118*n*. Main controller 116 and control modules 118A-118*n* together can be an example of communication system 10 as described above with respect to FIG. 1. More specifically, main controller 116 can be an embodiment of master controller 12, and control modules 118A-118*n* can be embodiments of slave modules 14A-14N. In some examples, control system 114, including main controller 116 and control modules 118A-118*n*, can be a programmable logic controller (PLC). Control modules 118A-118*n* are connected to each other and to main controller 116 in an inter-module communication bus (IMCB) arrangement. More specifically, main controller 116 and control modules 118A-118*n* are electrically and/or communicatively coupled, in series, between main controller 116 and a terminal (or serially-last in the sequence) one of control modules 118A-118*n* (e.g., control module 118*n*). In some examples, main controller 116 and each of control modules 118A-118*n* are mounted together on a rack or DIN rail. For purposes of simplicity and ease of discussion, the term "IMCB communications" is used in the subsequent description to encompass the communication process set forth above with respect to FIGS. 1-4E for, e.g., sending the communication schedule and/or identifying modules.

Although three control modules 118A-118*n* are illustrated in FIG. 5, it should be understood that other examples of control system 114 can include more or fewer control modules 118A-118*n*. In some examples, control system 114 is a modular system, and the number of control modules 118A-118*n* can be adjusted based on the number of inputs and outputs desired for the process carried out by system 100. Accordingly, control system 114 can include any suitable number of control modules 118A-118*n*. Depending on the process associated with system 100, control system 114 may be in a hazardous location, such as locations where main controller 116 and/or control modules 118A-118*n* are exposed to flammable or explosive vapors.

Although not shown in the example of FIG. 5 for purposes of clarity and ease of illustration, main controller 116 and each of control modules 118A-118*n* includes one or more processors and computer-readable memory. Examples of the one or more processors can include any one or more of a microprocessor, a digital signal processor (DSP), an application specific integrated circuit (ASIC), a field-programmable gate array (FPGA), or other equivalent discrete or integrated logic circuitry.

Computer-readable memory of main controller 116 and control modules 118A-118*n* can be configured to store information within main controller 116 and control modules 118A-118*n* during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of main controller 116 and control modules 118A-118*n* can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories.

Main controller 116 is a centralized controller of system 100. In general, main controller 116 can have the same structure and function as described above with respect to master controller 12 in FIGS. 1-4E. Control modules 118A-118*n* are input/output (I/O) modules of control system 114 that are coupled to main controller 116. In general, control modules 118A-118*n* can have the same structure and function as described above with respect to slave modules 14A-14N in FIGS. 1-4E. Each of control modules 118A-118*n* includes an onboard memory (i.e., computer-readable memory). Any one or more of control modules 118A-118*n* can be, for example, analog input/output (AIO) modules, digital input/output (DIO) modules, digital output (DO) modules, fiber optic communications (FO) modules, power isolation (PI) modules, or other module types.

Each of control modules 118A-118*n* is configured to receive one or more electrical or optical connections (e.g., connections 115A-115*n*, as described in greater detail below) for connecting to inputs and/or outputs of system 100 (e.g., devices 112A-112*n*). Each of control modules 118A-118*n* can include one or more terminals (i.e., pins, connectors, or channels) for receiving the connections. More specifically, each of control modules 118A-118*n* can be configured to receive and/or transmit a signal (i.e., data, such as status or command data) and/or power via a connection to a respective pin on the corresponding one of control modules 118A-118*n*. Accordingly, the one or more terminals or pins of control modules 118A-118*n* can each have a corresponding pin type, such as input or output, sourcing or sinking, high speed, etc. Individual control modules 118A-118*n* can receive an input via a corresponding pin, which can be defined by a range or maximum accepted voltage, current, and/or power. Different ones of control modules 118A-118*n*, or different pins of one of control modules 118A-118*n*, can accept different voltages (or current or power) or the same voltage (or current or power), depending on the individual I/O module requirements. Similarly, individual control modules 118A-118*n* can transmit signals as an output via a corresponding pin, which can be defined by a range or maximum voltage, current, and/or power. Different ones of control modules 118A-118*n*, or different pins of one of control modules 118A-118*n*, can transmit signals at different voltages (or current or power) or the same voltage (or current or power), depending on the individual I/O module requirements. In some examples, individual control modules 118A-118*n* can also receive or transmit optical signals, such as fiber optic signals, via one or more pins or connectors.

Connections 115A-115*n* are connections or interfaces between devices 112A-112*n* and control modules 118A-118*n*. Connections 115A-115*n* can transmit power and/or data between devices 112A-112*n* and corresponding ones of control modules 118A-118*n*. More specifically, connections 115A-115*n* are electrical or optical connections between each of devices 112A-112*n* and a respective pin of a corresponding one of control modules 118A-118*n*. In some examples, connections 115A-115*n* can extend between hazardous and non-hazardous locations. In some examples, connections 115A-115*n* can be wired connections. In some examples, connections 115A-115*n* can be electrical connections. In other examples, connections 115A-115*n* can be optical connections, such as fiber optic connections. For example, fiber optic connections can be used to facilitate the intrinsic safety of system 100 to limit electrical and/or thermal energy in the presence of, e.g., fumes or other hazardous materials, when connections 115A-115*n* are in or pass through a hazardous location. In yet other examples, connections 115A-115*n* can be wireless connections. In yet other examples, connections 115A-115*n* can include a combination of connection types (e.g., for communications between hazardous and non-hazardous locations).

As illustrated in FIG. 5, each of devices 112A-112*n* can be connected to a separate one of control modules 118A-118*n* by a corresponding one of connections 115A-115*n*. That is, one of connections 115A-115*n* can connect between one of devices 112A-112*n* and one of control modules 118A-118*n*. As illustrated in FIG. 5, device 112A is connected to control module 118A by connection 115A, device 112B is connected to control module 118B by connection 115B, and device 112*n* is connected to control module 118*n* by connection 115*n*. In other examples, one or more of devices 112A-112*n* and/or one or more of control modules 118A-118*n* can receive multiple connections 115A-115*n*. In some examples, multiple connections 115A-115*n* from a single one of devices 112A-112*n* can be connected to one or more of control modules 118A-118*n*. In some examples, multiple connections 115A-115*n* from a single one of control modules 118A-118*n* (e.g., from multiple pins on a single one of control modules 118A-118*n*) can be connected to one or more of devices 112A-112*n*. In some examples, ones of connections 115A-115*n* from multiple ones of devices 112A-112*n* can be connected to a same one of control modules 118A-118*n* (e.g., at different pins of the one of control modules 118A-118*n*).

Further, respective pins on control modules 118A-118*n* where one of connections 115A-115*n* is received can be moved between ones of control modules 118A-118*n*. For example, if control module 118B (or any of control modules 118A-118*n*) became damaged or malfunctioned, the respective pin from control module 118B connected to connection 115B could be moved to a compatible open position on a different one of control modules 118A-118*n* (e.g., control module 118A or control module 118*n*, in the example shown in FIG. 5). The resulting control system 114 could then include, for example, control module 118A receiving both connection 115A and connection 115B, control module 118B receiving no connections, and control module 118*n* receiving connection 115*n*.

User interface 120 is operatively coupled to control system 114 to enable user interaction with main controller 116, such as for configuring, initialization, monitoring, and/or control of system 100. User interface 120 can include a display device and/or other user interface elements (e.g., buttons, dials, graphical control elements presented at a touch-sensitive display, or other user interface elements). In some examples, user interface 120 includes a graphical user interface (GUI) that includes graphical representations of components and/or processes of system 100.

In operation, system 100 carries out an industrial process, such as a painting process, a finishing process, or other industrial process. Devices 112A-112*n* can receive power and/or data from control system 114 via connections 115A-115*n* to perform functions within the industrial process. For example, an actuator, such as a solenoid, can receive an electrical signal from control system 114 and turn the signal into a physical output, such as opening or closing. Devices 112A-112*n* can also transmit a signal to control system 114 via connections 115A-115*n* to perform functions within the industrial process. For example, a sensor, such as a flow meter, can transmit an electrical signal to control system 114 to indicate a sensed input, such as a rate of flow of a fluid in system 100.

Referring now to FIG. 6, FIG. 6 is a schematic block diagram illustrating details of control system 114 that correspond to a provisioning process for system 100. As illustrated in FIG. 6, control system 114 includes main controller 116, control modules 118A-118*n*, and user interface 120. Main controller 116 includes first processor 121A, second processor 121B, integrated development environment (IDE) 122, persistent memory 124, shared memory 126, pointer module 128, and web server 130. IDE 122 includes component libraries 132A-132*n*, which include corresponding component description files 134A-134*n* and component source files 136A-136*n*. Persistent memory 124 includes provisioning map 138.

Main controller 116 includes first processor 121A and second processor 121B. First processor 121A and second processor 121B can take the form of a multi-core processor of main controller 116. First processor 121A and second processor 121B can be the same or different types of processors. Although illustrated in FIG. 6 as two processors, it should be understood that other examples of main controller 116 can instead include more processers (e.g., additional processing cores) or a single processor. First processor 121A and second processor 121B are each connected to shared memory 126, so first processor 121A and second processor 121B can be indirectly connected to each other via shared memory 126.

First processor 121A can run an operating system, such as Linux. Integrated development environment (IDE) 122 can exist within the operating system on first processor 121A. IDE 122 is a software platform for industrial automation applications. In some examples, IDE 122 can be a runtime of CODESYS (a development tool based on the international industrial standard IEC 61131-3). In other examples, IDE 122 can be any suitable development environment for configuring and running applications. An application executed by IDE 122 can cause system 100 to carry out an industrial process, such as a painting process, a finishing process, or other industrial process, via devices 112A-112*n*.

Second processor 121B handles IMCB communications between main controller 116 and control modules 118A-118*n*. That is, the functionality described above with respect to master controller 12 (FIGS. 1-4E) can be carried out via second processor 121B.

Devices 112A-112*n* can be abstracted and defined within IDE 122 as virtual peripherals. On the other hand, control modules 118A-118*n* need not be virtualized inside IDE 122. Each of devices 112A-112*n* can correspond to a respective virtual peripheral defined within IDE 122. Virtual peripherals are defined using component libraries 132A-132*n* of IDE 122. Each virtual peripheral can correspond to a respective component library 132A-132*n*. In this way, each of devices 112A-112*n* also corresponds to a respective component library 132A-132*n*. IDE 122 can also include an I/O driver manager associated with control modules 118A-118*n*. Component libraries 132A-132*n* can be compatible with the I/O driver manager.

As illustrated in FIG. 6, each of component libraries 132A-132*n* includes a corresponding component description file 134A-134*n* and a corresponding component source file 136A-136*n*. In some examples, component description files 134A-134*n* can be extensible markup language (XML) files. Each component description file 134A-134*n* defines component parameters of the corresponding one of devices 112A-112*n*. The component parameters can include an identification of the corresponding one of devices 112A-112*n*, input parameters, output parameters, configuration settings, and any other component parameters. More specifically, the component parameters can include, e.g., an identification of the corresponding one of devices 112A-112*n*; an update rate; whether the corresponding one of devices 112A-112*n* is in a hazardous location; whether the corresponding one of devices 112A-112*n* is enabled; a part number or other unique identifier; a component terminal identification (representing the connection to the corresponding one of devices 112A-112*n* via one of connections 115A-115*n*); a component terminal type; a component power parameter (i.e., component power, voltage, and/or current draw); a wire color; etc. The component parameters can be described generally as metadata about devices 112A-112*n*. Further, the input parameters can represent the input signal that can be received by the corresponding one of devices 112A-112*n*; e.g., the input parameters can include a voltage, current, and/or power of the input signal. The output parameters can represent the output signal that can be transmitted by the corresponding one of devices 112A-112*n*; e.g., the output parameters can include a voltage, current, and/or power of the output signal. Component source files 136A-136*n* can be .C files. Component source files 136A-136*n* define functions corresponding to a functionality of the respective one of devices 112A-112*n* (i.e., what happens when the component parameters for the respective one of devices 112A-112*n* are used in an application in IDE 122). Component source files 136A-136*n* can also define required functions associated with the I/O driver manager.

IDE 122 includes variables, which can be associated with component parameters from one or more component description files 134A-134*n*. Variables from IDE 122 are used in applications that are run via IDE 122. When the variables from IDE 122 are associated with the component parameters (e.g., the defined inputs, outputs, and configuration settings) for a respective virtual peripheral, IDE 122 can interact with the corresponding component description file 134A-134*n* and the corresponding component source file 136A-136*n* to execute the functions. Variables from IDE 122 that are associated with component parameters for a respective virtual peripheral and then used in a particular application within IDE 122 can represent a system or process configuration of enabled virtual peripherals, i.e., ones of devices 112A-112*n* that are enabled for the particular application. In other words, the variables for a particular application that is loaded within IDE 122 can correspond to a group of enabled ones of devices 112A-112*n* within system 100.

Persistent memory 124 is a computer-readable memory of main controller 116 that is accessed by first processor 121A. IDE 122 (and any other components associated with first processor 121A, e.g., web server 130) can connect to persistent memory 124 to access or store data within persistent memory 124. For example, persistent memory 124 can be any suitable database.

Provisioning map 138 can represent a database design or schema within persistent memory 124. Provisioning map 138 includes metadata that corresponds to enabled virtual peripherals and metadata that corresponds to each of control modules 118A-118*n*. The metadata corresponding to enabled virtual peripherals can include any component parameters. The component parameters can be obtained, e.g., from component description files 134A-134*n* and loaded into provisioning map 138 by IDE 122. Accordingly, the metadata corresponding to the enabled virtual peripherals can include for each of the enabled virtual peripherals, e.g., an identification of the corresponding one of devices 112A-112*n*; an update rate; whether the corresponding one of devices 112A-112*n* is in a hazardous location; whether the corresponding one of devices 112A-112*n* is enabled; a part number or other unique identifier; a component terminal identification (representing the connection to the corresponding one of devices 112A-112*n* via one of connections 115A-115*n*); a component terminal type; a component power parameter (i.e., component power, voltage, and/or current draw); a wire color; etc.

Similarly, the metadata corresponding to control modules 118A-118*n* can include any parameters associated with control modules 118A-118*n*. The parameters associated with control modules 118A-118*n* can be obtained, e.g., via IMCB communications and loaded into provisioning map 138 from shared memory 126 by web server 130. Web server 130 can also load additional parameters associated with control modules 118A-118*n* from a configuration file, such as an XML file that is accessible by web server 130. For example, the metadata corresponding to control modules 118A-118*n* can include for each of control modules 118A-118*n*, e.g., an identification of the corresponding one of control modules 118A-118*n*; whether the corresponding one of control modules 118A-118*n* is enabled; module type information; a part number or other unique identifier; a number of terminals (or pins) on the corresponding one of control modules 118A-118*n*; a module terminal identification, such as a name and/or number, for each terminal (or pin) of the corresponding one of control modules 118A-118*n*; a module terminal type for each terminal (or pin) of the corresponding one of control modules 118A-118*n*; a module terminal power parameter (i.e., terminal power, voltage, and/or current draw) for each terminal (or pin) of the corresponding one of control modules 118A-118*n*; an onboard memory address; a location of the corresponding one of control modules 118A-118*n*; wire colors; etc. Further, the module terminal power parameter can represent the input signal that can be received by the corresponding one of control modules 118A-118*n*; e.g., the module terminal power parameter can include a voltage, current, and/or power of the input signal. In other examples, the module terminal power parameter can represent the output signal that can be transmitted by the corresponding one of control modules 118A-118*n*; e.g., the module terminal power parameter can include a voltage, current, and/or power of the output signal. The metadata corresponding to the enabled virtual peripherals and control modules 118A-118*n* can be organized into related tables or other data structures within provisioning map 138.

A provisioning configuration is generated and stored within persistent memory 138 during a provisioning process of system 100. The provisioning configuration can be a table or other data structure within provisioning map 138. The provisioning configuration represents a virtual map or configuration of how devices 112A-112*n* are connected to or will be connected to control modules 118A-118*n* by connections 115A-115*n* within system 100, specifically, which terminals correspond to (are connected to) which ones of devices 112A-112*n*. Accordingly, the provisioning configuration also represents a link between the respective terminal of control modules 118A-118*n* and the corresponding one of the enabled virtual peripherals (corresponding to the connected one of devices 112A-112*n*). Overall, the provisioning configuration represents a set or group of linked pairs of respective terminals of control module 118A-118*n* and corresponding enabled virtual peripherals. The provisioning configuration is based on the metadata that corresponds to each of the enabled virtual peripherals and the metadata that corresponds to each of control modules 118A-118*n*. More specifically, the provisioning configuration can include or can be populated with parameters that specify, for each for each linked pair of a respective terminal of control modules 118A-118*n* and a corresponding one of the enabled virtual peripherals, an identification of the respective one of control modules 118A-118*n*; a module terminal identification for the respective terminal of the respective one of control modules 118A-118*n*; an identification of the corresponding one of the enabled virtual peripherals that is linked with the respective terminal; a component terminal identification of the corresponding one of the enabled virtual peripherals; an update rate of the corresponding one of the enabled virtual peripherals; and a memory address corresponding to an onboard memory of the respective one of control modules 118A-118*n*.

Shared memory 126 is a computer-readable memory of main controller 116 that is accessed by both first processor 121A and second processor 121B. IDE 122 (and any other components associated with first processor 121A, e.g., web server 130) can connect to and communicate with control modules 118A-118*n* by interacting with shared memory 126. For example, data returned from IMCB communications can be stored in shared memory 126, which is then accessible by first processor 121A.

Pointer module 128 is a functional module of first processor 121A for linking enabled virtual peripherals and control modules 118A-118*n*. More specifically, pointer module 128 links (or uses pointers) between variables within IDE 122 that are associated with each enabled virtual peripheral and locations in shared memory 126 that are associated with corresponding ones of control modules 118A-118*n*. Accordingly, IDE 122 can obtain data from control modules 118A-118*n* (e.g., data returned from IMCB communications) and vice versa without the connection between IDE 122 and each of control modules 118A-118*n* being explicitly defined in software.

Web server 130 and user interface 120 form a web interface of system 100 for controlling, monitoring, or otherwise interacting with system 100. Web server 130 runs on first processor 121A. In some examples, web server 130 can run inside Linux or another operating system. A provisioning process for system 100 is executed via web server 130. In some examples, a user can interact with user interface 120 to provision system 100 via web server 130. Web server 130 can write data to persistent memory 124 and can connect to shared memory 126. For instance, web server 130 can access data from IMCB communications via shared memory 126.

During a provisioning process, an application is loaded, or started, in IDE 122. IDE 122 can identify one or more enabled virtual peripherals based on the process configuration for the particular application. This can be a standard step in any industrial application associated with system 100. IDE 122 can then load metadata corresponding to the enabled virtual peripherals into provisioning map 138 within persistent memory 124. That is, IDE 122 can load the component parameters, or a portion of the component parameters, associated with the enabled virtual peripherals into provisioning map 138 from component description files 134A-134*n*. A list or graphical representation of the enabled virtual peripherals can be displayed via user interface 120. IDE 122 can also pass information corresponding to the enabled virtual peripherals to pointer module 128. At this point, the application loaded in IDE 122 can be stopped and prevented from running until provisioning is complete.

Main controller 116 can initiate IMCB communications with control modules 118A-118*n*. IMCB communications can identify one or more control modules 118A-118*n* that are connected in control system 114. In some examples, IMCB communications can return basic information about each of control modules 118A-118*n*, such as a module type, a part number, a serial number, an indication of what software is loaded on the module, etc. Web server 130 can access additional information or parameters (e.g., in a configuration file) associated with each of control modules 118A-118*n* (or, in some examples, web server 130 can access a library of information associated with any possible I/O modules that could be used in system 100). Metadata corresponding to control modules 118A-118*n* can be loaded into provisioning map 138 within persistent memory 124 via, e.g., web server 130. That is, web server 130 can load the parameters, or a portion of the parameters, associated with control modules 118A-118*n* into provisioning map 138 from the IMCB communications and/or a configuration file. A list or graphical representation of control modules 118A-118*n* can be displayed via user interface 120.

A user can view the particular application that is running in IDE 122 and can interact with the lists of enabled virtual peripherals and control modules 118A-118*n*. Via user interface 120, a user can direct web server 130 on main controller 116 to map or link each of the enabled virtual peripherals to respective compatible terminals of control modules 118A-118*n*, forming links between each respective terminal and each corresponding one of the enabled virtual peripherals. That is, a user can associate each of the enabled virtual peripherals with respective compatible terminals of control modules 118A-118*n* via user interface 120, and main controller 116 links each of the enabled virtual peripherals to the respective terminal to build the provisioning configuration in accordance with the user's association. In some examples, forming the links can include a user performing a drag and drop activity between graphical representations of the enabled virtual peripherals and control modules 118A-118*n* via user interface 120.

Compatibility between the enabled virtual peripherals and respective terminals of control modules 118A-118*n* can be determined based on the metadata that corresponds to each of the enabled virtual peripherals and the metadata that corresponds to each of control modules 118A-118*n*. For example, a virtual peripheral and a terminal of control modules 118A-118*n* can be compatible when parameters associated with the enabled virtual peripheral and the terminal match. In some examples, matching parameters can have the same or an equal value. In other examples, matching parameters can have overlapping value ranges. In some examples, linking each of the enabled virtual peripherals to respective terminals of control modules 118A-118*n* includes matching the module terminal type parameter and the module terminal power parameter for a respective terminal of control modules 118A-118*n* to a compatible, or matching, pair of a component terminal type parameter and a component power parameter that correspond to one of the enabled virtual peripherals. Successfully linking each of the enabled virtual peripherals to respective terminals of control modules 118A-118*n* forms a set of linked pairs of respective terminals and corresponding enabled virtual peripherals.

This process of forming the links between each respective terminal and each corresponding one of the enabled virtual peripherals builds, or generates, the provisioning configuration of provisioning map 138. A database design of persistent memory 124 (e.g., provisioning map 138) and other system checks enforce proper mapping between compatible ones of the one or more enabled virtual peripherals and the one or more terminals. For example, the provisioning process can prevent linking between incompatible ones of the enabled virtual peripherals and the one or more terminals of control modules 118A-118*n*.

Once the links that make up the provisioning configuration have been generated, the provisioning configuration can be passed from web server 130 to persistent memory 124, to IDE 122, and to shared memory 126. Web server 130 can also pass the provisioning configuration to pointer module 128. The provisioning configuration is passed or written to each of control modules 118A-118*n* via IMCB communications from second processor 121B. The provisioning configuration can be stored in the onboard memory of each of control modules 118A-118*n*.

Pointer module 128 receives or can connect to the information about the enabled virtual peripherals from IDE 122, information about control modules 118A-118*n* from shared memory 126, and the provisioning configuration from web server 130. Pointer module 128 can match the information about the enabled virtual peripherals to the information about control modules 118A-118*n* to establish an indirect connection between variables in IDE 122 and control modules 118A-118*n* based on the provisioning configuration. The provisioning process guards against pointer module 128 pointing incorrectly between virtual peripherals (and variables in IDE 122) and control modules 118A-118*n*.

As a final step, a bus communication schedule (as described in greater detail above with respect to FIG. 1) can be generated based on an update rate that is associated with each of the enabled virtual peripherals and corresponding ones of control modules 118A-118*n* (according to the provisioning configuration). The bus communication schedule is passed or written to each of control modules 118A-118*n* via IMCB communications from second processor 121B. In some examples, the bus communication schedule can be written to control modules 118A-118*n* at the same time as the provisioning configuration.

The provisioning process allows devices 112A-112*n* to be connected to corresponding terminals of control modules 118A-118*n* within system 100 based on the link in the provisioning configuration between the respective terminal and the corresponding one of the enabled virtual peripherals.

System 100, implementing techniques of this disclosure, enables devices 112A-112*n* to be easily reused across projects because the provisioning process for system 100 is based on interactions with devices 112A-112*n* that are predefined in component libraries 132A-132*n*. This is advantageous when the same types of devices 112A-112*n* are used repeatedly in different industrial processes.

The provisioning process described herein enables controller hardware (e.g., control modules 118A-118*n*) to be essentially invisible to a software design for a particular application for system 100. That is, application software for system 100 can be designed without concern for exactly how devices 112A-112*n* are connected to control modules 118A-118*n*. In contrast, typical industrial systems can include application software that is tied to a specific controller hardware configuration or combination of hardware. In typical systems, the application software is written such that application variables are tied to inputs and outputs from the controller hardware. As such, the application software only "sees" the inputs and outputs of the controller hardware—it is not directly tied to the devices that are connected to the controller hardware inputs and outputs. One significant limitation of that type of system is that the application software needs to be rewritten if there are changes to the controller hardware (e.g., removing, replacing, or adding control modules).

According to techniques of this disclosure, application software running in IDE 122 can be designed based on devices 112A-112*n* (instead of inputs and outputs of control modules 118A-118*n*) because the application variables are tied to corresponding virtual peripherals that are defined by component libraries 132A-132 for each of devices 112A-112*n*. The application software is not directly tied to inputs and outputs of control modules 118A-118*n*. The level of indirection between the application software in IDE 122 and control modules 118A-118*n* is accomplished via web server 130 and pointer module 128, which establish the link between corresponding (e.g., compatible) virtual peripherals and control modules terminals during the provisioning process. In this way, application software and controller hardware for system 100 are kept relatively separate.

Because the controller hardware is essentially invisible to any application software of system 100, it is possible to avoid rewriting the software if there is a change to the controller hardware. For example, if one of control modules 118A-118*n* needs to be removed or replaced, the software would not need to change because the connection in the software is tied to the abstracted devices 112A-112*n* rather than to the specific control module. A user can simply move any devices that were connected to the old control module to a new control module and re-run the provisioning process. Moreover, abstracting devices 112A-112*n* allows a developer to write the application software in a way that is consistent with how the developer might be thinking about system 100 in terms of the devices and the industrial process steps, rather than inputs and outputs of control modules 118A-118*n*.

This separation between the application software and control modules 118A-118*n* also enables different people to work on system 100. For example, a developer can define logics in the application software (in IDE 122) for each device 112A-112*n*. A technician who wires the connection between devices 112A-112*n* and control modules 118A-118*n* can access user interface 120 to provision system 100 without needing the developer to write or rewrite the application software based on the connections that are made.

Thus, system 100, implementing techniques of this disclosure, is flexible with respect to the setup of any hardware of control system 114. It is relatively easy to grow the system by adding and defining new devices in IDE 122 and/or making changes to the configuration of control modules 118A-118*n* by removing, replacing, or adding modules.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A communications system for an industrial process, the communications system comprising:

a master controller; and a plurality of slave modules connected in series with the master controller;

wherein the master controller is configured to:

transmit downstream messages in a downstream direction through the plurality of slave modules according to a communication schedule, each of the downstream messages including header payload information with a schedule identifier that indicates an order number of the respective downstream message defined by the communication schedule; and receive upstream messages originating from the plurality of slave modules and transmitted by the plurality of slave modules in an upstream direction through each of the plurality of slave modules to the master controller; and wherein each respective slave module of the plurality of slave modules is configured to:

receive the downstream messages;

generate the upstream messages having the schedule identifiers that correspond to the schedule identifiers included in the downstream messages;

transmit the upstream messages in the upstream direction; and insert response information into upstream messages having schedule identifiers corresponding to the schedule identifiers in the downstream messages identified as associated with the response information from the respective slave module; and wherein the respective slave module of each of the plurality of slave modules comprises:

a first transceiver configured to receive and transmit the downstream messages; and a second transceiver configured to receive and transmit the upstream messages.

2. The communications system of claim 1, wherein the first transceiver and the second transceiver are implemented as part of a common communication bus.

3. The communications system of claim 2, wherein the first transceiver and the second transceiver share a return memory as part of the common communication bus.

4. The communications system of claim 2, wherein the master controller is configured to identify each of the plurality of slave modules via the common communication bus.

5. The communications system of claim 2, wherein the master controller and each of the plurality of slave modules are connected to each other in an inter-module communication bus arrangement.

6. The communications system of claim 1, wherein the first transceiver comprises:

a first receive buffer configured to receive downstream communication data;

a first buffer memory configured to store the header payload information of the downstream messages via direct memory access;

a first transmit buffer configured to transmit downstream communication data; and a first processor configured to identify, based on the schedule identifiers included in the header payload information of the downstream messages, downstream messages that are associated with the response information from the respective slave module.

7. The communications system of claim 6, wherein the first processor performs a cyclical redundancy check on the header payload information against a fixed-length check value included in the downstream communication data to determine whether the fixed-length check value satisfies the cyclical redundancy check.

8. The communications system of claim 7, wherein the first processor, in response to determining the fixed-length check value does not satisfy the cyclical redundancy check, refrains from processing the downstream communication data or transmitting the downstream messages.

9. The communications system of claim 1, wherein the second transceiver comprises:

a second receive buffer configured to receive upstream data;

a second buffer memory configured to store the header payload information of the upstream messages via direct memory access;

a second transmit buffer configured to transmit upstream data;

a CRC buffer; and a second processor configured to identify, based on the communication schedule, the response information associated with the respective slave module.

10. The communications system of claim 9, wherein the second processor is further configured to verify the response information associated with the respective slave module by:

storing the response information in the second transfer buffer via direct memory access;

storing the response information in the CRC buffer via direct memory access;

performing a cyclical redundancy check on the response information stored in the second transfer buffer to generate a calculated CRC; and comparing the calculated CRC against CRC criteria to determine whether the calculated CRC satisfies the CRC criteria.

11. The communications system of claim 10, wherein the CRC criteria includes a fixed-length check value included in the upstream data.

12. The communications system of claim 10, wherein the second processor, in response to determining that the calculated CRC does not satisfy the CRC criteria, transfers a failure node identifier corresponding to the respective slave module from the CRC buffer to the second transfer buffer.

13. The communications system of claim 1, wherein the master controller is further configured to store the communication schedule.

14. The communications system of claim 1, wherein the master controller is further configured to transmit the communication schedule to each of the plurality of slave modules.

15. The communications system of claim 1, wherein the master controller is further configured to determine the communication schedule.

16. The communications system of claim 1, wherein each of the plurality of slave modules stores the communication schedule; and wherein each of the plurality of slave modules is configured to identify whether the downstream messages are associated with response information from the respective slave module based on a comparison of the schedule identifiers with the communication schedule stored at the respective slave module.

17. The communications system of claim 16, wherein the communication schedule further defines, for each of the plurality of slave modules:

a local memory address for each of the downstream messages associated with the respective slave module;

a size of each of the downstream messages associated with the respective slave module;

a memory offset value within the downstream messages associated with the respective slave module at which information corresponding to the respective slave module is located within the downstream messages; and a memory offset value within upstream messages at which the respective slave module is to insert response information into the upstream messages.

18. The communications system of claim 1, wherein the master controller is further configured to identify the relative order of the plurality of slave modules in the series connection and identity of each of the slave modules during an initialization phase of the communications system.

19. The communications system of claim 18, wherein each of the plurality of slave modules is pre-provisioned to store, within computer-readable memory of the respective slave module, a location identifier having a value defined as corresponding to an uninitialized slave module; and wherein the master controller is further configured to identify the relative order and the identity of each of the slave modules by iteratively:

transmitting, in a downstream direction, an identification class message that includes:

a location identifier having the value defined as corresponding to the uninitialized slave module; and a commanded location identifier; and identifying, as next in the relative order of the plurality of slave modules in the series connection, a respective one of the plurality of slave modules corresponding to identity information received in an upstream identification class message.

20. The communications system of claim 1, wherein each of the plurality of slave modules is configured to insert the schedule identifiers that correspond to the schedule identifiers included in the header payload information of the downstream messages into the upstream messages.

* * * * *